US009161264B2

(12) United States Patent
Liu

(10) Patent No.: US 9,161,264 B2
(45) Date of Patent: Oct. 13, 2015

(54) CONVERGENT TRANSMISSION SYSTEM AND APPARATUS, DATA OFFLOADING AND CONVERGING METHOD

(71) Applicant: Huawei Technologies Co., Ltd., Shenzhen, Guangdong (CN)

(72) Inventor: Sheng Liu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 148 days.

(21) Appl. No.: 14/081,284

(22) Filed: Nov. 15, 2013

(65) Prior Publication Data
US 2014/0071925 A1 Mar. 13, 2014

Related U.S. Application Data

(63) Continuation of application No. PCT/CN2011/075068, filed on May 31, 2011.

(51) Int. Cl.
*H04W 28/08* (2009.01)
*H04W 36/22* (2009.01)
*H04W 72/04* (2009.01)

(52) U.S. Cl.
CPC ............ *H04W 28/085* (2013.01); *H04W 28/08* (2013.01); *H04W 36/22* (2013.01); *H04W 72/0486* (2013.01)

(58) Field of Classification Search
CPC ... H04W 28/08; H04W 28/085; H04W 36/22; H04W 28/20; H04W 72/005; H04W 40/02; H04W 72/044
See application file for complete search history.

(56) References Cited

U.S. PATENT DOCUMENTS

| 2004/0001468 | A1 | 1/2004 | Bichot et al. |
| 2006/0079236 | A1 | 4/2006 | Del Pino et al. |
| 2007/0230409 | A1 | 10/2007 | Semper et al. |
| 2009/0318124 | A1 | 12/2009 | Haughn |
| 2011/0103356 | A1* | 5/2011 | Chandrasekaran ........... 370/338 |
| 2012/0020260 | A1* | 1/2012 | Chen et al. .................... 370/310 |
| 2012/0142278 | A1* | 6/2012 | Wang et al. .................... 455/68 |
| 2012/0300638 | A1* | 11/2012 | Zhou et al. .................... 370/236 |

FOREIGN PATENT DOCUMENTS

| CN | 1666547 A | 9/2005 |
| CN | 101827396 A | 9/2010 |
| CN | 101984713 A | 3/2011 |

(Continued)

OTHER PUBLICATIONS

"3rd Generation Partnership Project; Technical Specification Group Services and System Aspects; IP flow mobility and seamless Wireless Local Area Network (WLAN) offload; Stage 2 (Release 10)", 3GPP TS 23.261 V10.1.0 (Sep. 2010), 22 pages.

(Continued)

*Primary Examiner* — Raj Jain

(57) ABSTRACT

A convergent transmission system includes a data offloading and converging node, a cellular access point, and a WLAN AP. The data offloading and converging node is configured to: negotiate with a UE to determine a data offloading policy; according to the data offloading policy determined by negotiating with the UE, use a WLAN radio bearer to transmit a part of user data, and the cellular access point is configured to work with the UE and the data offloading and converging node to transmit the remaining part of the user data.

30 Claims, 18 Drawing Sheets

(56) References Cited

FOREIGN PATENT DOCUMENTS

EP 1662726 A1 5/2006
RU 2007114891 A 10/2008

OTHER PUBLICATIONS

3rd Generation Partnership Project; Technical Specification Group Services and System Aspects; 3GPP system to Wireless Local Area Network (WLAN) interworking; System description (Release 10), 3GPP TS 23.234 V10.0.0 (Mar. 2011), 84 pages.

"3rd Generation Partnership Project; Technical Specification Group GSM/EDGE Radio Access Network; Generic Access Network (GAN); Stage 2 (Release 10)", 3GPP TS 43.318 V10.1.0 (Mar. 2011), 128 pages.

"3rd Generation Partnership Project; Technical Specification Group Services and System Aspects; Mobility between 3GPP-Wireless Local Area Network (WLAN) interworking and 3GPP systems (Release 9)", 3GPP TS 23.327 V9.0.0 (Dec. 2009), 27 pages.

Wi-Fi Offload Whitepaper, Version 1.0, Apr. 19, 2010, GSMA Association, 29 pages.

"Universal Mobile Telecommunications System (UMTS); LTE; IP flow mobility and seamless Wireless Local Area Network (WLAN) offload; Stage 2 (3GPP TS 23.261 version 10.1.0 Release 10)", ETSI TS 123 261 v10.1.0, May 2011, 23 pages.

John L. Tomici, et al., "Multi-Rat Traffic Offloading Solutions for the Bandwidth Crunch Problem", IEEE, May 6, 2011, 6 pages.

\* cited by examiner

CONVERGENT TRANSMISSION SYSTEM AND APPARATUS, DATA OFFLOADING AND CONVERGING METHOD

CROSS-REFERENCE TO RELATED APPLICATIONS

This application is a continuation of international application no. PCT/CN2011/075068, filed on May 31, 2011, which is hereby incorporated by reference in its entirety.

TECHNICAL FIELD

The present invention relates to the communications field, and in particular, to a convergent transmission system and apparatus, and a data offloading and converging method.

BACKGROUND

With rapid development of smart phones, WLAN (Wireless Local Area Network, also known as WiFi, Wireless Fidelity) communication modules are integrated into more and more mobile communication terminals; meanwhile, with the continuous increase of people's requirements on mobile broadband, the existing cellular communication system bears more and more pressure of data traffic.

A practicable solution is to integrate the cellular technology with the WLAN technology and use the WLAN to offload the data traffic of the mobile cellular communication system so as to improve the user experience of the cellular system. However, all the existing WLAN networking ways have a common characteristic that the WLAN is a completely independent network. Therefore, mobile operators who have no fixed network resources need to construct a new transmission network for the WLAN, which increases the period and cost of network construction. The WLAN is independent of the cellular network, and the transmission delay varies sharply between IP packets and is uncontrollable. With the same IP data flow being transmitted on such two networks, serious disorder will occur, and the QOS (quality of service) will deteriorate.

Therefore, the existing mutual integration way increases the period and cost of network construction greatly, and deteriorates the quality of service of the mobile communication network.

SUMMARY

Embodiments of the present invention provide a convergent transmission system and apparatus, and a data offloading and converging method to reduce the period and cost of network construction and improve quality of service of the mobile communication network.

In one aspect, an embodiment of the present invention provides a convergent transmission system, including a data offloading and converging node, a cellular access point, and a WLAN access point, where:

the data offloading and converging node is configured to: negotiate with a user equipment (UE) to determine a data offloading policy; according to the data offloading policy determined by negotiating with the UE, use a WLAN radio bearer to transmit a part of user data, where the WLAN radio bearer is a result of configuring a part of radio bearers of a cellular system as WLAN radio links; and use a remaining radio bearer of the cellular system to transmit a remaining part of the user data, where the radio bearers are a radio part of bearer channels of the cellular system, and the bearer channels of the cellular system are created through control plane signaling of the cellular system;

the WLAN access point is configured to work with the UE and the data offloading and converging node to transmit the part of the user data; and the cellular access point is configured to work with the UE and the data offloading and converging node to transmit the remaining part of the user data.

In another aspect, an embodiment of the present invention provides a data offloading and converging method, including:

negotiating with a UE (user equipment) to determine a data offloading policy;

according to the data offloading policy determined by negotiating with the UE, using a WLAN radio bearer to transmit a part of user data, where the WLAN radio bearer is a result of configuring a part of radio bearers of a cellular system as WLAN radio links; and using a remaining radio bearer of the cellular system to transmit a remaining part of the user data, where the radio bearers are a radio part of bearer channels of the cellular system, and the bearer channels of the cellular system are created through control plane signaling of the cellular system.

In another aspect, an embodiment of the present invention provides a data offloading and converging node, including:

an offloading policy negotiating module, configured to negotiate with a user equipment (UE) to determine a data offloading policy; and an offload deciding module, configured to: according to the data offloading policy determined by negotiating with the UE, use a WLAN radio bearer to transmit a part of user data, where the WLAN radio bearer is a result of configuring a part of radio bearers of a cellular system as WLAN radio links; and use a remaining radio bearer of the cellular system to transmit a remaining part of the user data, where the radio bearers are a radio part of bearer channels of the cellular system, and the bearer channels of the cellular system are created through control plane signaling of the cellular system.

In another aspect, an embodiment of the present invention provides an uplink data offloading method, including:

obtaining, by a UE, uplink user data; and according to a data offloading policy determined by negotiating with a data offloading and converging node, using a WLAN radio bearer to transmit a part of the uplink user data to the data offloading and converging node, and using channels of a cellular system to transmit a remaining part of the uplink user data to the data offloading and converging node, whereupon the data offloading and converging node converges the part of the uplink user data and the remaining part of the uplink user data into uplink user data.

In another aspect, an embodiment of the present invention provides a UE, including:

an uplink user data obtaining module, configured to obtain uplink user data; and an uplink data offloading module, configured to: according to a data offloading policy determined by negotiating with a data offloading and converging node, use a WLAN radio bearer to transmit a part of the uplink user data to the data offloading and converging node, and use channels of a cellular system to transmit a remaining part of the uplink user data to the data offloading and converging node, whereupon the data offloading and converging node converges the part of the uplink user data and the remaining part of the uplink user data into uplink user data.

According to the foregoing technical solutions of the embodiments of the present invention, the WLAN radio bearer is a result of configuring a part of radio bearers of a cellular system as WLAN radio links. Therefore, the data offloading and converging node replaces the radio bearers of the cellular system partially or completely with the WLAN radio bearer, in which the data offloading and converging node is fully transparent to the core network; and the WLAN access is implemented without the need of modifying the cellular network, which reduces the period and cost of network construction. The WLAN radio bearer may serve as a technology of enhancing radio air interfaces to improve data transmission rates greatly, enhance the user experience, and improve quality of service of the mobile communication network.

BRIEF DESCRIPTION OF THE DRAWINGS

To describe the technical solutions of the embodiments of the present invention more clearly, the following briefly introduces the accompanying drawings used in the description of the embodiments of the present invention. Apparently, the accompanying drawings described below illustrate only some exemplary embodiments of the present invention, and persons skilled in the art may derive other drawings from the drawings without making creative efforts.

DETAILED DESCRIPTION

The technical solutions of the embodiments of the present invention are hereinafter described clearly and with reference to embodiments and accompanying drawings. Evidently, the embodiments are only some exemplary embodiments of the present invention, and the present invention is not limited to such embodiments. All other embodiments, which can be derived by persons skilled in the art from the embodiments of the present invention without making creative efforts, shall fall within the protection scope of the present invention.

To help persons skilled in the art better understand the technical solutions of the embodiments of the present invention, the following describes relevant technologies.

The user experience of a cellular system can be improved greatly by integrating the wireless cellular technology with the WLAN technology and using a WLAN to offload the data traffic of the mobile cellular communication system.

Figure 1:
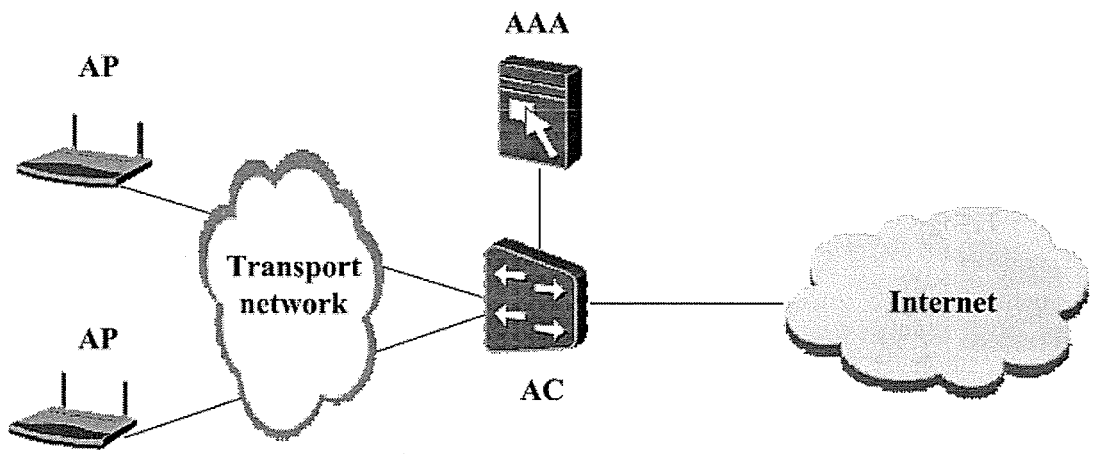
FIG. 1 shows a solution to integrating a cellular network with a WLAN according to according to the prior art.
Figure 2:
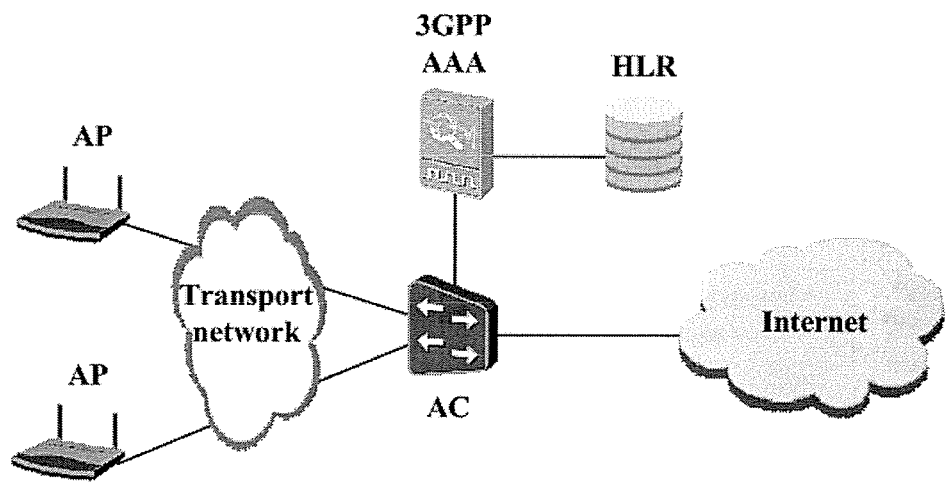
FIG. 2 shows a solution to integrating a cellular network with a WLAN according to the prior art.

Many solutions are available for integrating a cellular network with a WLAN, and the simplest one is an independent WLAN networking solution characterized by AP (access point)+AC (AP controller), as shown in FIG. 1 and FIG. 2.

As shown in FIG. 1, an AP is an access point of a WLAN; after undergoing an association and authentication procedure, a WLAN terminal, such as UE, may communicate with the AP; the functions of an AC are routing and switching and managing AP, and the outbound interface of the AC is an IP interface. Therefore, a user IP data packet from the AP may enter an external IP packet network through the AC, typically the Internet. To perform authentication, authorization and accounting to users, the AC is connected to an AAA (authentication, authorization and accounting) server. Generally, a user accesses a WLAN network by entering an account name and a password that are provided by an operator.

In a WLAN shown in FIG. 2, a 3GPP AAA server in a mobile communication network such as GPRS (General Packet Radio Service), UMTS (Universal Mobile Telecommunications System), or LTE (Long Term Evolution, Long Term Evolution) of a mobile operator bears authentication, authorization and accounting. The 3GPP AAA server is connected to an HLR (Home Location Register, home location register). In this way, the user does not need to input the account name or password manually, and the mobile phone may authenticate the user automatically according to subscription data stored in a SIM (subscriber identity module) or USIM (universal subscriber identity module), thereby simplifying and facilitating the use of the WLAN greatly.

Although the networking solution of an independent WLAN is simple, the networking solution supports neither interworking with the mobile communication network nor reuse of an existing device in the mobile communication network such as GPRS, UMTS, or LTE. The interworking not supported includes: switching between the WLAN and the mobile communication network, and accessing a PS (Packet-Switched Domain, packet-switched domain) service of the mobile communication network through the WLAN, such as an IMS (IP Multimedia Subsystem, IP multimedia subsystem) service. The unlicensed spectrum used by the WLAN is vulnerable to different types of interference, and the WLAN AP (access point) is generally set up in hotspot areas, instead of being networked to provide continuous coverage. Therefore, when the WLAN is unavailable due to interference, or, when the UE leaves the coverage area of the AP, it is very important to hand over the UE to a mobile communication network such as GPRS, UMTS, or LTE. Therefore, in an embodiment, an I-WLAN (Interworking WLAN, interworking WLAN) networking way of the 3GPP may be applied, as shown in FIG. 3 and FIG. 4.

Figure 3:
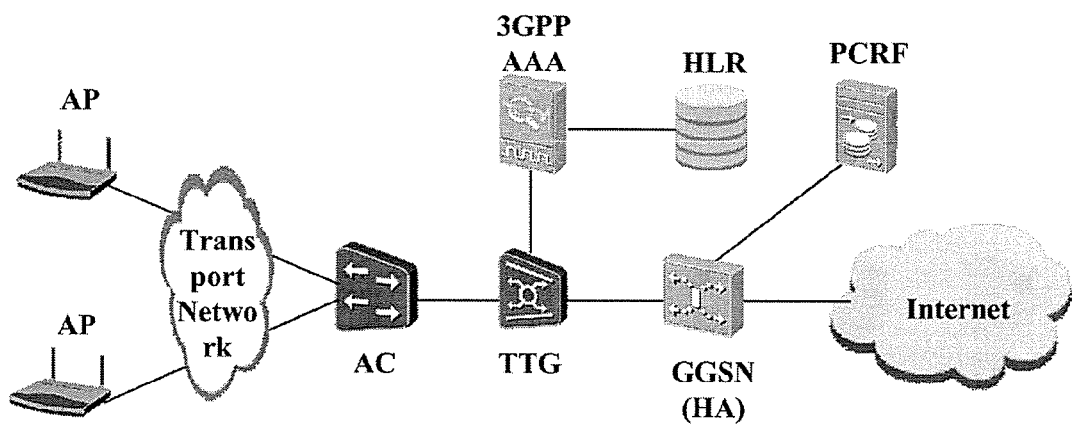
FIG. 3 shows an I-WLAN networking solution according to the prior art.
Figure 4:
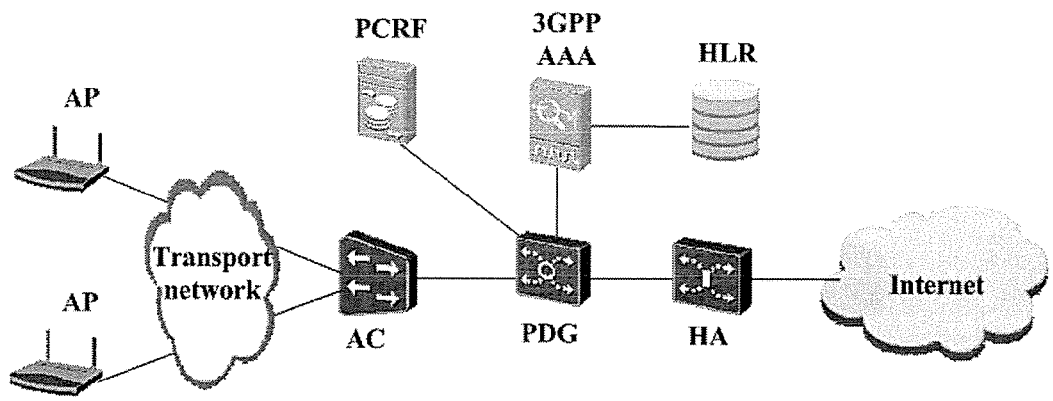
FIG. 4 shows an I-WLAN networking solution according to according to the prior art.

Taking the GPRS and the UMTS system as examples, as shown in FIG. 3, an AC is connected to a GGSN (Gateway GPRS Support Node, gateway GPRS support node) through a TTG (Tunnel Terminating Gateway, tunnel terminating gateway). The GGSN is a gateway between the GPRS/UMTS system and the external IP network. The TTG serves the function of connecting with the GGSN through a 3GPP Gn interface. In this way, the WLAN is connected with the GGSN through the TTG to implement interworking with the mobile communication network such as GPRS, UMTS, or LTE and reuse the existing functions of the mobile communication network such as authentication, authorization, accounting, policy control and traffic policing. The I-WLAN networking way shown in FIG. 4 is the same as the I-WLAN networking way shown in FIG. 3 except that the TTG function is integrated with the GGSN function into a PDG (Packet Data Gateway, packet data gateway). The HA in FIG. 3 is integrated onto the GGSN.

Based on the I-WLAN way, the 3GPP further puts forward IFOM (IP Flow Mobility and Seamless WLAN Offloading, IP flow mobility and seamless WLAN offloading) in 3GPP Release 10 to enhance the user experience. The IFOM allows a UE (User Equipment, user equipment) to use the mobile communication network such as GPRS, UMTS, or LTE to transmit some IP data flows of the UE, and use the I-WLAN network to transmit other different IP data flows, thereby implementing more flexible data offloading and enhancing a user's peak rate.

For an independent WLAN and I-WLAN, existing WLAN networking ways have a common characteristic that the WLAN is a completely independent network. Therefore, mobile operators who have no fixed network resources need to construct a new transmission network for the WLAN, which increases the period and cost of network construction.

Figure 5:
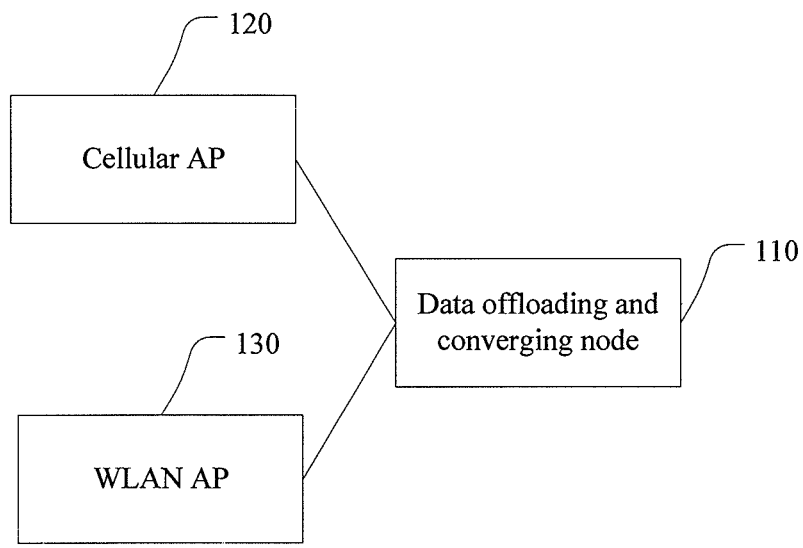
FIG. 5 is a structural diagram of a convergent transmission system according to an embodiment of the present invention.

To reduce the period and cost of the operator's network construction and improve the transmission rate of the mobile communication network users, an embodiment of the present invention provides a convergent transmission system. As shown in FIG. 5, the system includes a data offloading and converging node 110, a cellular access point 120, and a WLAN AP 130.

The data offloading and converging node 110 is configured to: negotiate with a user equipment (UE) to determine a data offloading policy; according to the data offloading policy determined by negotiating with the UE, configure a part of existing radio bearers of a cellular system as WLAN radio bearers, and use the WLAN radio bearers to transmit a part of user data; and use a remaining radio bearer of the cellular system to transmit a remaining part of the user data, where the radio bearers are a radio part of bearer channels of the cellular system, and the bearer channels of the cellular system are created through control plane signaling of the cellular system.

Through the foregoing functions, the data offloading and converging node uses the WLAN radio bearers to transmit a part of the user data, and uses the channels of the cellular system to transmit the remaining part of the user data.

In an embodiment, the data offloading and converging node is further configured to use channels of a universal cellular system to transmit control plane messages.

The cellular AP 120 is configured to work with the UE and the data offloading and converging node to transmit the part of the user data.

The WLAN AP 130 is configured to work with the UE and the data offloading and converging node to transmit the remaining part of the user data.

Optionally, when the cellular system is a UMTS system, in an embodiment, the data offloading and converging node 110 negotiates with the UE to determine the data offloading policy through application layer offloading control signaling. The application layer offloading control signaling is transmitted over at least one UMTS bearer by the data offloading and converging node, and the at least one UMTS bearer is created for the UE through the control plane of the UMTS air interface.

Specifically in an embodiment, the data offloading and converging node 110 is configured to: in a downlink direction, offload the obtained downlink user data of the UE to separate the first part of data to be transmitted through the cellular AP 120 from the second part of data to be transmitted through the WLAN AP 130, and transmit the first part of data and the second part of data to the cellular AP 120 and the WLAN AP 130 respectively; and, in an uplink direction, receive the first part of uplink user data and the second part of uplink user data of the UE from the cellular AP 120 and the WLAN AP 130 respectively, converge the first part of uplink user data and the second part of uplink user data into uplink user data, and send the uplink user data to a cellular network.

In an embodiment, the data offloading and converging node 110 is configured to receive the second part of uplink user data of the UE from the WLAN AP 130; and converge the UE's first part of uplink user data received from the cellular AP 120 and the UE's second part of uplink user data received from the WLAN AP 130 into uplink user data, and send the uplink user data to the cellular network.

The cellular AP 120 is configured to: in the downlink direction, receive the first part of data transmitted by the data offloading and converging node 110 and send the first part of data through an air interface; and, in the uplink direction, receive the first part of uplink user data sent by the UE and transmit it to the data offloading and converging node 110.

The WLAN AP 130 is configured to: in the downlink direction, receive the second part of data transmitted by the data offloading and converging node 110 and send the second part of data through the air interface; and, in the uplink direction, receive the second part of uplink user data sent by the UE and transmit it to the data offloading and converging node 110.

In an embodiment, the bearer channel of the cellular system may be a UMTS channel. In the following embodiment, the UMTS channel is described as an example of the bearer channel of the cellular system.

According to the foregoing technical solution of the embodiment of the present invention, the WLAN radio bearer is a result of configuring a part of radio bearers of a cellular system as WLAN radio links. Therefore, the data offloading and converging node replaces the radio bearers of the cellular system partially or completely with the WLAN radio bearer, in which the data offloading and converging node is fully transparent to the core network; and the WLAN access is implemented without the need of modifying the cellular network, which reduces the period and cost of network construction. The WLAN radio bearer may serve as a technology of enhancing radio air interfaces to improve data transmission rates greatly, enhance the user experience, and improve quality of service of the mobile communication network.

It should be noted that the convergent transmission system shown in FIG. 5 may be applied in multiple different architectures. For example, it may be applied in a UMTS system, a UMTS HNB system, a GPRS system, an EDGE (Enhanced Data rates for GSM Evolution) system, a CDMA2000 system, or an EVDO (Evolution-Data Optimized or Evolution-Data Only) system. The data offloading and converging node 110 varies in different cellular networks. For example, the node is an RNC in a UMTS system, or an HNB GW or HNB in a UMTS HNB system, or a BSC in a GPRS system, or a BSC in an EDGE system, or a BSC in a CDMA2000 system, or a BSC in an EVDO system.

Figure 9A:
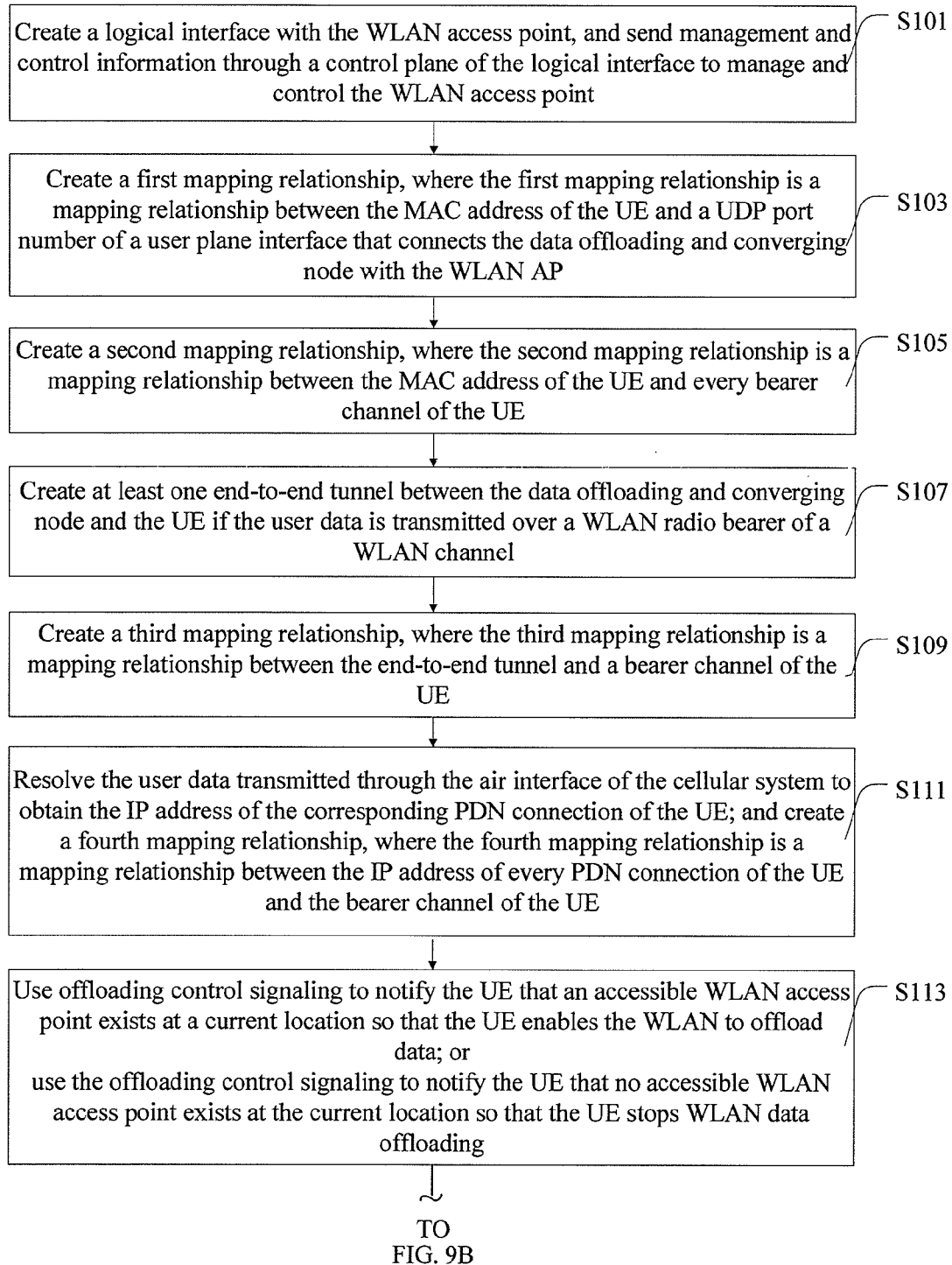
FIG. 9A and FIG. 9B show a data offloading and converging method according to an embodiment of the present invention.
Figure 9B:
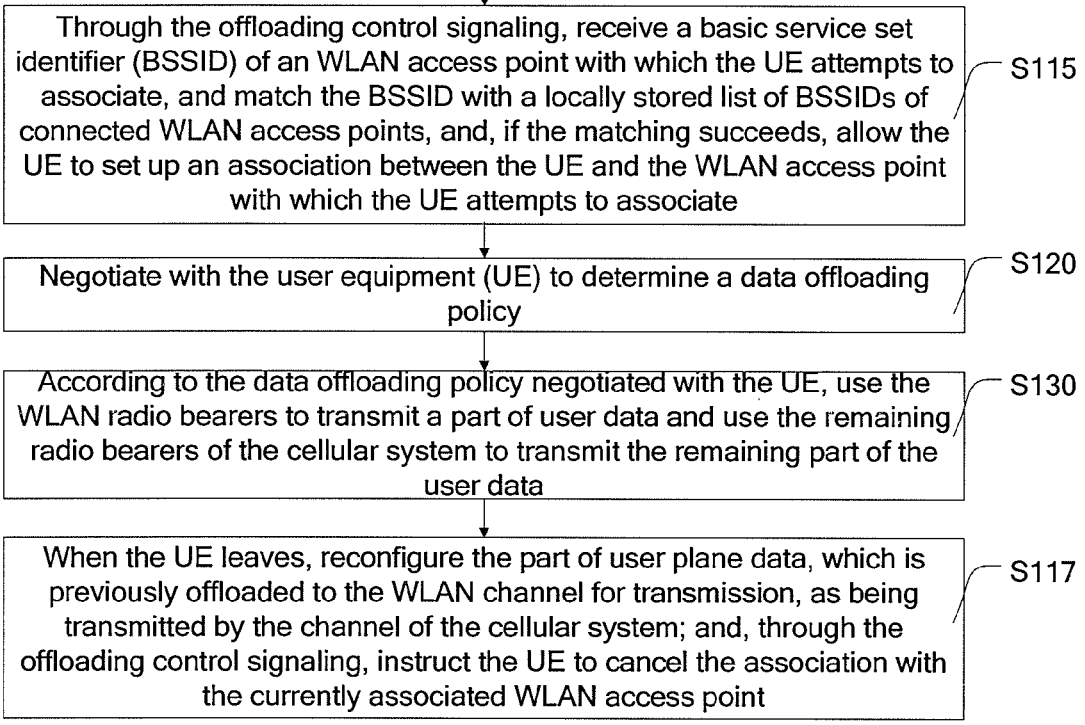

As shown in FIG. 9A and FIG. 9B, an embodiment of the present invention provides a data offloading and converging method, including the following steps:

S120: Negotiate with a user equipment (UE) to determine a data offloading policy.

Optionally, the details of step S120 may be: negotiate with the UE to determine a data offloading policy through offloading control signaling, where the offloading control signaling is carried in an application layer message transferred between the data offloading and converging node and the UE, or, the offloading control signaling is carried in an RRC (Radio Resource Control, radio resource control) message transferred between the data offloading and converging node and the UE.

S130: According to the data offloading policy determined by negotiating with the UE, use a WLAN radio bearer to transmit a part of user data, where the WLAN radio bearer is a result of configuring a part of radio bearers of a cellular system as WLAN radio links; and use a remaining radio bearer of the cellular system to transmit a remaining part of the user data, where the radio bearers are a radio part of bearer channels of the cellular system, and the bearer channels of the cellular system are created through control plane signaling of the cellular system.

Optionally, step S130 may include:

in the downlink direction, offloading the downlink user data of the UE to separate the first part of data to be transmitted through the cellular access point from the second part of data to be transmitted through the WLAN access point, and transmitting the first part of data and the second part of data to the cellular access point and the WLAN access point respectively; and in the uplink direction, receiving the first part of uplink user data and the second part of uplink user data of the UE from the cellular access point and the WLAN access point respectively, converging the first part of uplink user data and the second part of uplink user data into uplink user data, and sending the uplink user data to the cellular network.

Optionally, in an embodiment, the method may further include the following steps:

S101: Create a logical interface with the WLAN access point, and send management and control information through the control plane of the logical interface to manage and control the WLAN access point.

S103: Create a first mapping relationship, where the first mapping relationship is a mapping relationship between the MAC (media access control) address of the UE and the UDP (User Datagram Protocol) port number of the user plane interface that is between the data offloading and converging node and the WLAN AP.

S105: Create a second mapping relationship, where the second mapping relationship is a mapping relationship between the MAC address of the UE and every bearer channel of the UE.

Optionally, in an embodiment, step S105 may include:

receiving the UE's international mobile subscriber identity (IMSI) and MAC address that are sent by the UE through the offloading control signaling; and creating a mapping relationship between the MAC address of the UE and every bearer channel of the UE according to a stored mapping relationship between the IMSI of the UE and every bearer channel of the UE.

In an embodiment, the method may further include the following steps:

S107: Create at least one end-to-end tunnel between the data offloading and converging node and the UE if the user data is transmitted over a WLAN radio bearer, where each end-to-end tunnel transmits one of the UE's data flows transmitted over the WLAN radio bearer.

S109: Create a third mapping relationship, where the third mapping relationship is a mapping relationship between the end-to-end tunnel and the bearer channel of the UE.

The tunnel number of an end-to-end tunnel may be a UDP port number in an outer UDP/IP packet that encapsulates the user IP packet, or a radio access bearer (RAB) identifier (ID) corresponding to the end-to-end tunnel.

S111: Resolve the user data transmitted through the air interface of the cellular system to obtain the IP address of the corresponding PDN connection of the UE; and create a fourth mapping relationship, where the fourth mapping relationship is a mapping relationship between the IP address of every PDN connection of the UE and the bearer channel of the UE.

In an embodiment, each PDN connection of the UE corresponds to a bearer channel.

In this case, optionally, in an embodiment, step S130 may include:

in the uplink direction, receiving the uplink data flow that needs to be transmitted over the WLAN radio bearer, where the uplink data flow that needs to be transmitted over the WLAN radio bearer is sent by the WLAN access point to the data offloading and converging node through a corresponding UDP port;

obtaining the MAC address corresponding to the UDP port according to the first mapping relationship;

finding all bearer channels of the UE having the MAC address according to the second mapping relationship;

according to the third mapping relationship, finding the bearer channel of the UE corresponding to each end-to-end tunnel that transmits the part or all of the uplink data flows; and forwarding the part or all of the data flows to the corresponding bearer channels of the UE respectively;

in the downlink direction, receiving different downlink data flows transmitted over the corresponding downlink bearer channels of the UE, where the different downlink data flows are obtained by a GGSN by separating the downlink data of the UE through a DL-TFT (downlink traffic flow template) function; and according to the data offloading policy negotiated with the UE, determining, by the data offloading and converging node, a part or all of the downlink data flows transmitted over the WLAN radio bearer; and according to the third mapping relationship, mapping the part or all of the downlink data flows to an end-to-end tunnel corresponding to each UE bearer channel that transmits the part or all of the downlink data flows, respectively; and sending the part or all of the downlink data flows to the WLAN access point through the corresponding UDP port, whereupon, according to the first mapping relationship, the WLAN access point uses the UDP port number to send all the UE's downlink data packets from the UDP port through a WLAN air interface to the UE that has the MAC address corresponding to the UDP port number.

In this case, optionally, in an embodiment, step S130 may include:

in the uplink direction, receiving all the UE's uplink data packets that are sent by the WLAN access point to the data offloading and converging node through the corresponding UDP port;

obtaining the MAC address corresponding to the UDP port according to the first mapping relationship;

finding all bearer channels of the UE having the MAC address according to the second mapping relationship;

separating all the UE's uplink data packets transmitted over the WLAN radio bearer into at least one data flow according to the UE's IP addresses in different PDN connections, and using the fourth mapping relationship to forward the at least one data flow to the corresponding bearer channel of the UE;

in the downlink direction, separating the downlink data flows of each PDN connection of the UE into different downlink data flows through a built-in packet filter; and sending a part or all of the downlink data flows to the WLAN access point through the corresponding UDP port according to the data offloading policy negotiated with the UE, whereupon, according to the first mapping relationship, the WLAN access point uses the UDP port number to send all the UE's downlink data packets from the UDP port through a WLAN air interface to the UE that has the MAC address corresponding to the UDP port number.

In an embodiment, the method may further include the following steps:

S113: Use offloading control signaling to notify the UE that an accessible WLAN access point exists at the current location, so that the UE enables the WLAN to offload data; or use the offloading control signaling to notify the UE that no accessible WLAN access point exists at the current location, so that the UE stops WLAN data offloading.

S115: Through the offloading control signaling, receive a basic service set identifier (BSSID) of the WLAN access point with which the UE attempts to associate; and match the BSSID with a locally stored list of BSSIDs of connected WLAN access points, and, if the matching succeeds, allow the UE to set up an association between the UE and the WLAN access point with which the UE attempts to associate.

S117: When the UE leaves, reconfigure the part of user data, which is previously offloaded by the WLAN channel for transmission, as being transmitted by the channel of the cellular system; and, through the offloading control signaling, instruct the UE to cancel the association with a currently associated WLAN access point.

In an embodiment, the method may further include the following authentication procedure:

sending the UE's MAC address to the WLAN access point, or receiving the IP address from the UE through the offloading control signaling, and sending the MAC address and IP address of the UE to the WLAN access point; and negotiating with the UE about the encryption algorithm of the WLAN air interface and the key of the encryption algorithm through the offloading control signaling, and sending the encryption algorithm and the key of the encryption algorithm to the WLAN access point, so that the WLAN access point sets up a binding relationship between the MAC address and the key of the encryption algorithm or sets up a binding relationship between the MAC address and IP address and the key of the encryption algorithm and regards the UE fulfilling the binding relationship as an authenticated legal terminal.

According to the foregoing technical solution of the embodiment of the present invention, the data offloading and converging node replaces the radio bearers of the cellular system partially or completely with the WLAN radio bearer, in which the data offloading and converging node is fully transparent to the core network; and the WLAN access is implemented without the need of modifying the cellular network, which reduces the period and cost of network construction. The WLAN radio bearer may serve as a technology of enhancing radio air interfaces to improve data transmission rates greatly, enhance the user experience, and improve quality of service of the mobile communication network.

Figure 10:
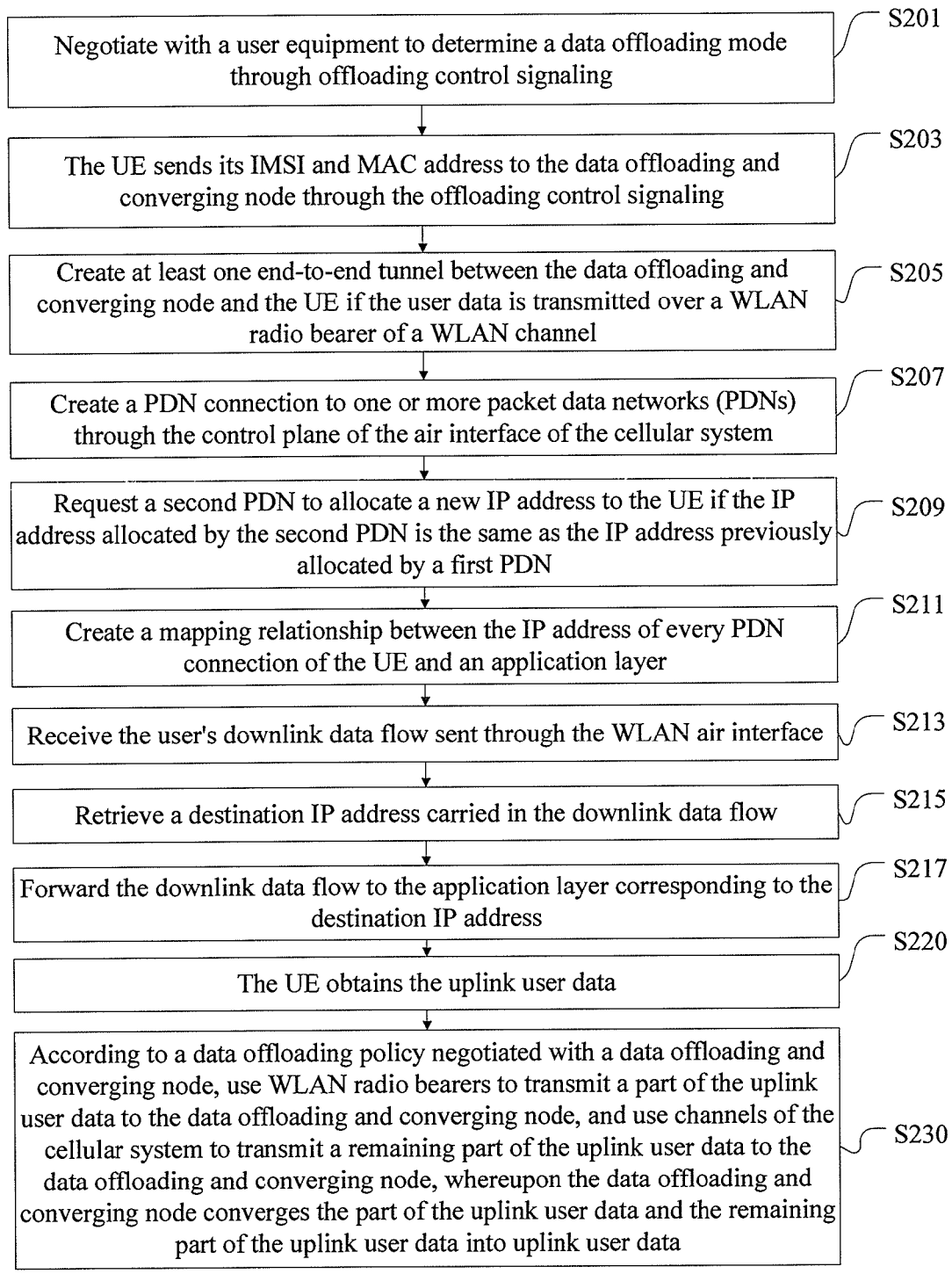
FIG. 10 is a flowchart of an uplink data offloading method according to an embodiment of the present invention.

As shown in FIG. 10, an embodiment of the present invention further provides an uplink data offloading method. The method includes the following steps:

S220: The UE obtains uplink user data.

S230. According to a data offloading policy negotiated with a data offloading and converging node, use a WLAN radio bearer to transmit a part of the uplink user data to the data offloading and converging node, and use channels of a cellular system to transmit a remaining part of the uplink user data to the data offloading and converging node, whereupon the data offloading and converging node converges the part of the uplink user data and the remaining part of the uplink user data into uplink user data.

Optionally, the method may further include the following steps:

S201. Negotiate with the UE to determine a data offloading policy through offloading control signaling, where the offloading control signaling is carried in an application layer message transferred between the data offloading and converging node and the UE, or, the offloading control signaling is carried in an RRC message transferred between the data offloading and converging node and the UE.

S203: Through the offloading control signaling, the UE sends its own IMSI and MAC address to the data offloading and converging node, so that according to the locally stored mapping relationship between the IMSI of the UE and every bearer channel of the UE, the data offloading and converging node sets up a mapping relationship between the MAC address of the UE and every bearer channel of the UE.

S205: Create at least one end-to-end tunnel between the UE and the data offloading and converging node if the user data is transmitted over a WLAN radio bearer, where each end-to-end tunnel transmits one of the UE's data flows transmitted over the WLAN radio bearer.

The tunnel number of an end-to-end tunnel may be a UDP port number in an outer UDP/IP packet that encapsulates the user IP packet, or a radio access bearer (RAB) identifier (ID) corresponding to the end-to-end tunnel.

S207: Create a PDN connection to one or more packet data networks (PDNs) through the control plane of the air interface of the cellular system, where each PDN connection corresponds to a bearer channel, and an IP address is allocated to each PDN connection.

S209: Request the second PDN to allocate a new IP address to the UE if the IP address allocated by the second PDN is the same as the IP address previously allocated by the first PDN.

S211: Set up a mapping relationship between the IP address of every PDN connection of the UE and the application layer.

In this case, in an embodiment, step S230 may include:
separating the uplink user data into uplink data flows through an uplink traffic flow template (UL-TFT); and
sending a part or all of the data flows to the data offloading and converging node through the end-to-end tunnel, where the part or all of the uplink data flows carry the tunnel number of the end-to-end tunnel.

In this case, in an embodiment, step S230 may include:
separating the uplink user data of each PDN connection from the application layer into uplink data flows through a packet filter located outside a transceiving module of the cellular system; and
sending a part or all of the user data flows through a WLAN air interface according to the data offloading policy, where the part or all of the user data flows carry the IP address corresponding to the application layer.

In an embodiment, the method may further include the following steps:

S213: Receive the user's downlink data flow sent through the WLAN air interface.

S215: Retrieve a destination IP address carried in the downlink data flow.

S217: Forward the downlink data flow to the application layer corresponding to the destination IP address.

In an embodiment, if the UE wants to associate with a WLAN AP, the method may further include the following step:

Through the offloading control signaling, the UE sends to the data offloading and converging node a BSSID of the WLAN AP with which the UE attempts to associate, so that the data offloading and converging node matches the BSSID with a locally stored list of BSSIDs of connected WLAN access points, and, if the matching succeeds, allows the UE to set up an association between the UE and the WLAN access point with which the UE attempts to associate.

According to the foregoing technical solution of the embodiment of the present invention, the data offloading and converging node replaces the radio bearers of the cellular system partially or completely with the WLAN radio bearer, in which the data offloading and converging node is fully transparent to the core network; and the WLAN access is implemented without the need of modifying the cellular network, which reduces the period and cost of network construction. The WLAN radio bearer may serve as a technology of enhancing radio air interfaces to improve data transmission rates greatly, enhance the user experience, and improve quality of service of the mobile communication network.

Figure 6:
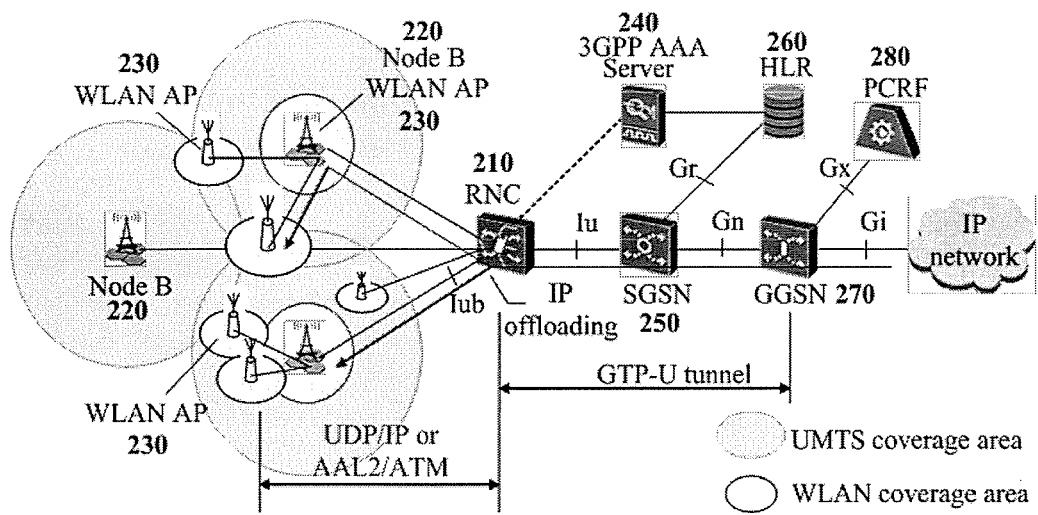
FIG. 6 is an architecture diagram of a convergent transmission system according to an embodiment of the present invention.
Figure 7:
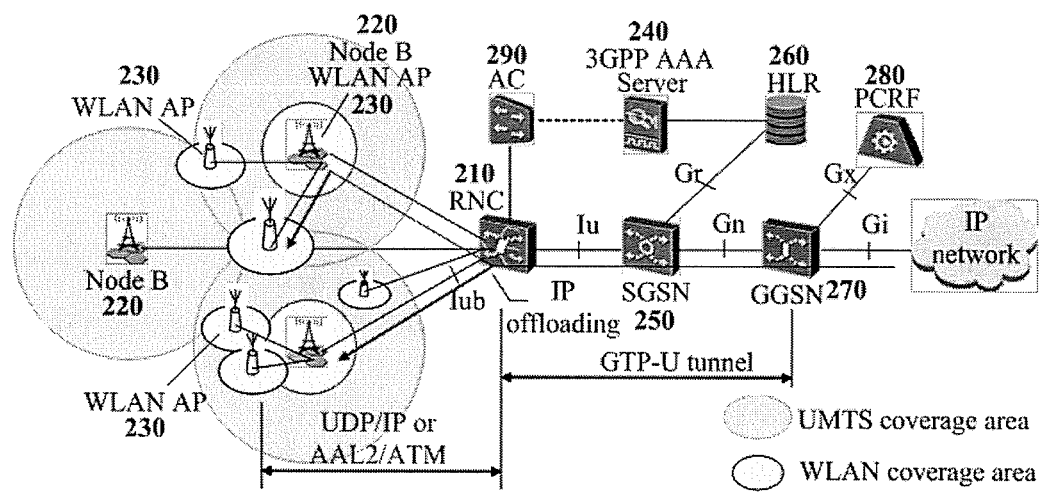
FIG. 7 is an architecture diagram of a convergent transmission system according to an embodiment of the present invention.

The principles of each system above are similar, and the embodiments of the present invention make specific introduction by taking a UMTS system as an example. FIG. 6 and FIG. 7 show the architectures of two kinds of convergent transmission systems according to embodiments of the present invention. In the convergent transmission systems provided in FIG. 6 and FIG. 7, the UMTS network is closely coupled with the WLAN network.

As shown in FIG. 6, the SGSN (Serving GPRS Support Node, serving GPRS support node), GGSN, PCRF (policy and charging rules function), HLR, and 3GPP AAA server are PS domain core network (Core Network) elements defined in the existing 3GPP protocol system.

The interface between the SGSN and the GGSN is a Gn interface, the interface between the GGSN and an external packet data network (such as an IP network) is a Gi interface, the interface between the SGSN and the HLR is a Gr interface, and the interface between the GGSN and the PCRF is a Gx interface. An RNC (Radio Network Controller, radio network controller) and a Node B are network elements in a UMTS radio access network. The Node B (a specific form of the cellular AP 120) is a base station which is common in the mobile communication system. The Node B is connected to the RNC through an Iub interface, and the RNC is connected to the SGSN through an Iu interface.

As shown in FIG. 6, in the architecture of a convergent transmission system in an embodiment of the present invention, the RNC is the data offloading and converging node 110 described in the embodiments above.

The WLAN AP is logically connected to the RNC, and the specific method is: in an embodiment the WLAN AP may share a site with the Node B and is connected to the RNC, or in an embodiment the WLAN AP does not share a site with the Node B but is connected to the RNC through the Node B, or in an embodiment the WLAN AP does not share a site with the Node B and is connected to the RNC directly. When the WLAN AP shares a site with the Node B, the WLAN AP and the Node B may be the same physical device, that is, the functions of the WLAN AP are integrated in the Node B; or, they may be two independent physical devices. When the WLAN AP does not share a site with the Node B, if the WLAN AP is connected to the RNC through the Node B, an IP line is generally applied between the Node B and the WLAN AP. Meanwhile, the RNC is connected to an AAA server so that access authentication can be implemented for WLAN users. The connection way between the RNC and the AAA server is the same as the aforementioned connection way between the AC or TTG and the AAA server in the existing WLAN network. As shown in 6, in an embodiment, the AAA server may be a 3GPP AAA server. In the system architecture shown in FIG. 6, the 3GPP AAA server is connected to the HLR. In this way, the user does not need to input the account name or password manually, and the mobile phone may authenticate the user automatically according to subscription data stored in a SIM or USIM, thereby simplifying and facilitating the use of the WLAN greatly.

In the architecture of the convergent transmission system shown in FIG. 6, the RNC not only has the UMTS-related functions defined in the existing 3GPP protocol system, but also has the function of offloading the user data flows between the UMTS and the WLAN. That is, the RNC uses a WLAN radio bearer and/or UMTS channels to transmit user data, and still uses the UMTS channels to transmit the control plane messages of the UMTS. In addition, in the embodiment shown in FIG. 6, the RNC further includes the control and management function of the AC in the existing WLAN network. That is, the RNC creates a logical interface with the WLAN AP, and sends management and control information through the control plane of the logical interface to manage and control the WLAN AP. In an embodiment, the management and control exercised by the RNC on the WLAN AP may include functions such as authenticating the WLAN AP connected to the RNC, performing network management, and coordinating and managing the interference between WLAN APs.

FIG. 7 shows the architecture of another convergent transmission system according to an embodiment of the present invention. In the system architecture shown in FIG. 7, the UMTS is closely coupled with the WLAN. The system architecture in FIG. 7 differs from the system architecture shown in FIG. 6 in that: the functions of the AC are not integrated in the RNC that serves as a data offloading and converging node in this embodiment. That is, in this embodiment, the AC serves as an independent device connected to the RNC.

In this embodiment, the RNC not only has the UMTS-related functions defined in the existing 3GPP protocol system, but also has the function of offloading the user data flows between the UMTS and the WLAN. That is, the RNC uses a WLAN radio bearer and/or UMTS channels to transmit user data, but uses the UMTS channels to transmit the control plane messages.

In this embodiment, the AC creates a logical interface with the WLAN AP, and sends management and control information through the control plane of the logical interface to manage and control the WLAN AP. In an embodiment, the management and control exercised by the AC on the WLAN AP may include the WLAN management and control functions such as authenticating the WLAN AP connected to the RNC, performing network management, and coordinating and managing the interference between WLAN APs.

That is, in this embodiment, the control and management functions (including the WLAN-related management and control functions such as authenticating the WLAN AP connected to the RNC, performing network management, and coordinating and managing the interference between WLAN APs) of the AC in the existing WLAN network are not integrated in the RNC. Instead, such functions are implemented by an independent device AC (AP Controller, AP controller). The AC is connected to the RNC and the AAA server, and the transport layer between the AC and the RNC may be an IP line.

As shown in FIG. 6 and FIG. 7, the RNC is connected to the AAA server (which may be a 3GPP AAA server) directly or through the AC. Therefore, the RNC may collect statistics on the information such as the traffic and duration of the user data that passes through the UMTS air interface and the WLAN air interface respectively, and send the information to the AAA server. The AAA server generates relevant charging data record information according to such information, and submits the charging data record information to an offline or online charging system. Therefore, the system can implement a required charging function.

As shown in FIG. 6 and FIG. 7, the Iu interface between the SGSN and the RNC is divided into a control plane and a user plane that are transmitted through different transport protocols respectively. The control plane protocol is called RANAP (Radio Access Network Application Part, Radio Access Network Application Part), which implements transmission through a Signaling Transport Protocol (SIGTRAN). The user plane protocol in the PS domain is transparent. That is, the user data is carried over a GTP-U (GPRS Tunneling Protocol-User plane, GPRS Tunneling Protocol-User plane) tunnel. The GTP-U tunnel is uniquely identified by a combination of a TEID (Tunnel Endpoint Identifier, tunnel endpoint identifier) at the header of the GTP-U, a UDP port number of the UDP/IP layer, and an IP address. In the following description, the combination of the TEID, UDP port number and IP address, which uniquely identifies a GTP-U tunnel, is called a GTP-U tunnel identifier.

The Iub interface is also divided into a control plane and a user plane. When the Iub interface implements transmission through ATM (asynchronous transfer mode), the user plane protocol Iub-FP (Frame Protocol, Frame Protocol) of the Iub interface is carried over AAL2 (ATM adaptation layer type 2). When the Iub interface implements transmission through IP, the user plane protocol Iub-FP of the Iub interface is carried over UDP. Specifically, each common channel uses a transmission channel for transmission, and each dedicated channel uses a dedicated transmission channel for transmission; dedicated channels include DCH (Dedicated Channel, dedicated channel) and E-DCH (Enhanced DCH, enhanced dedicated channel); and transmission channels include AAL2/ATM or UDP/IP. Different transmission channels are distinguished by a transmission address (AAL2 connection number or UDP port number).

As mentioned above, in the system architecture shown in FIG. 6, the RNC not only has the UMTS-related functions defined in the existing 3GPP protocol system, but also creates a management channel to the WLAN AP. Through the management channel, the RNC sends management and control information to manage and control the WLAN AP. The user data is transmitted through a WLAN radio bearer and/or UMTS channel, and the control plane messages of the UMTS air interface are transmitted through a UMTS channel.

In the system architecture shown in FIG. 6, a logical interface exists between the RNC and the WLAN AP. The logical interface is divided into a control plane and a user plane. The control plane of the logical interface serves to transmit WLAN-related management and control information to manage and control the WLAN AP; and the control plane also serves to transmit information related to user plane management and control to manage the user plane transmission channels between the RNC and the WLAN AP. The user plane serves to transmit the user data flows that are offloaded to the WLAN AP and transmitted through the WLAN network. The user plane implements transmission through the way of UDP over IP, and the control plane implements transmission through the way of TCP over IP or SCTP over IP.

As mentioned above, in the system architecture shown in FIG. 7, the RNC not only has the UMTS-related functions defined in the existing 3GPP protocol system, but also transmits user data through a WLAN radio bearer and/or UMTS channel, and also transmits control plane messages of the UMTS air interface through a UMTS channel. The AC serves to create a management channel to the WLAN AP, and send management signaling through the management channel to manage and control the WLAN AP.

In the system architecture shown in FIG. 7, a logical interface also exists between the AC and the WLAN AP. The control plane of the logical interface may implement transmission through the way of TCP over IP or SCTP over IP, and serve to transmit WLAN-related management and control information to manage and control the WLAN AP. The logical interface between the RNC and the WLAN AP is also divided into a control plane and a user plane. The control plane serves to transmit information related to user plane management and control to manage the user plane transmission channels between the RNC and the WLAN AP. The user plane serves to transmit the user data flows that are offloaded to the WLAN AP and transmitted through the WLAN network.

Specially, in an embodiment, the logical interface between the RNC and the WLAN AP in FIG. 6 includes a section between the RNC and the Node B, and the logical interface between the AC and the WLAN AP in FIG. 6 also includes a section between the RNC and the Node B (this occurs if the RNC and the Node B share a site, or if the RNC and the Node B do not share a site but the WLAN AP is connected to the RNC through the Node B), and the sections between the RNC and the Node B implement co-transmission with an Iub interface by means of tunnels, that is, when the Iub interface implements transmission through ATM, the tunnel is an AAL2/ATM tunnel; when the Iub interface implements transmission through IP, the tunnel is a UDP/IP tunnel.

Figure 8:
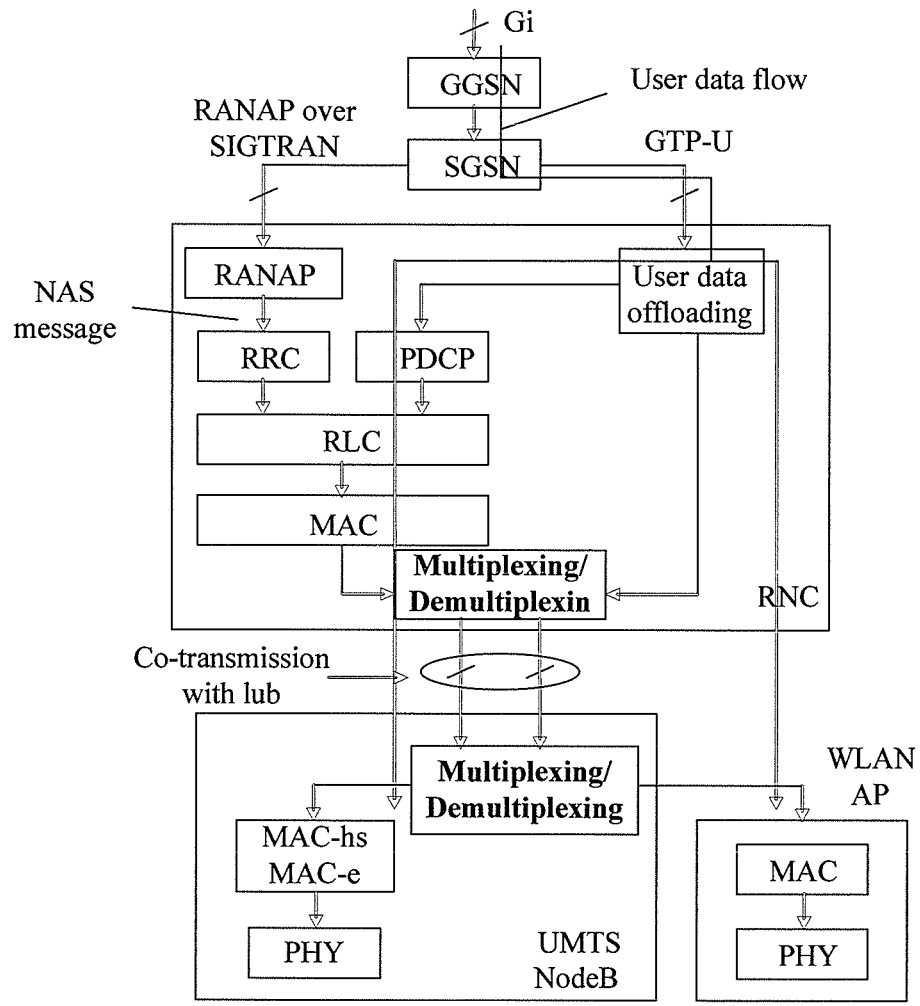
FIG. 8 is a schematic diagram of user data transmission according to an embodiment of the present invention.

FIG. 8 is a schematic diagram of user data transmission according to an embodiment of the present invention. In the downlink direction, for example, the user data passes through the Gi interface to arrive at the GGSN, and then passes through the GTP-U tunnel and the SGSN to arrive at the RNC.

The user data arriving at the RNC is separated by user data offloading into two parts for being transmitted through the air interface of the UMTS and the air interface of the WLAN respectively.

For the part transmitted through the UMTS, the transmission procedure is the same as the transmission procedure under the standard UMTS protocol. That is, the transmission procedure is: the data is processed by the PDCP/RLC/MAC protocol stack, sent by the user plane protocol Iub-FP of the Iub interface to the Node B (not illustrated in the Iub-FP diagram), and then passes through the MAC-hs (HSDPA MAC layer) and the physical layer (PHY) to form downlink radio signals, which are finally modulated to the radio frequency and sent out.

The part transmitted through the WLAN air interface is directly transmitted to the WLAN AP or forwarded by the Node B to the WLAN AP (this occurs when the WLAN AP and the Node B do not share a site, or the WLAN AP is connected to the RNC through the Node B), and then passes through the MAC layer and physical layer of the WLAN, and is then transmitted through the WLAN air interface.

As shown in FIG. 8, in an embodiment, a multiplexing/demultiplexing operation occurs on the RNC and Node B. When the WLAN AP and the Node B do not share a site, the multiplexing/demultiplexing operation is intended to implement co-transmission of the user data transmitted through the WLAN air interface with the Iub interface.

Specifically, the multiplexing/demultiplexing operation on the RNC uses different transmission channels to carry the Iub-FP data and the user data transmitted over the WLAN air interface separately, and then multiplexes the two parts of data onto a physical line of the Iub interface, that is, the two parts of data may be co-transmitted on the Iub interface. For the different channels above, in an embodiment, when the Iub transmits user data through ATM, the user data may be carried on an AAL2 channel; in an embodiment, when the Iub transmits user data through IP, the user data may be carried on a UDP channel.

Therefore, the multiplexing/demultiplexing operation on the Node B is to demultiplex the multiplexed data into two flows. For the user data transmitted through the WLAN, when the WLAN AP and the Node B do not share a site, different WLAN APs are differentiated by the UDP port number, and the user data is sent to a corresponding WLAN AP through the way of UDP over IP. In an embodiment, the multiplexing/demultiplexing operation may be implemented by the RNC and the Node B; in an embodiment, the multiplexing/demultiplexing operation may also be implemented by an external device. The procedure in the uplink direction is contrary to that in the downlink direction, and is not described here.

According to the foregoing technical solution of the embodiment of the present invention, the data offloading and converging node replaces the UMTS radio bearers partially or completely with the WLAN radio bearer, in which the data offloading and converging node is fully transparent to the core network; and the WLAN access is implemented without the need of modifying the cellular network, which reduces the period and cost of network construction. The WLAN radio bearer may serve as a technology of enhancing radio air interfaces to improve data transmission rates greatly, enhance the user experience, and improve quality of service of the mobile communication network.

The following uses the system architectures in FIG. 6 and FIG. 7 as an example to specifically describe the data offloading and converging solution provided in an embodiment of the present invention, and the functions of each device in the system. For ease of describing the solution in the embodiment of the present invention, the following describes the UMTS bearer mechanism briefly:

A UE may be connected to multiple PDNs (packet data networks) (that is, multiple PDN connections may be created). One PDN connection includes at least one UMTS bearer. A UMTS bearer is a basic unit for the UMTS network to control QoS (quality of service). To differentiate the packets on a UMTS bearer from the data packets of the user application layer, each UMTS bearer corresponds to a TFT (Traffic Flow Template, traffic flow template). The TFT is a set of packet filters. Each packet filter typically includes the characteristics such as the IP address of an accessed remote server, protocol type, and port range, and serves to match and separate the IP packets of same characteristics. Therefore, through the TFT, the user data flows are separated into multiple IP data flows (one IP data flow includes multiple IP packets). The multiple IP data flows pass through different UMTS bearers, and are transmitted in the UMTS network.

Figure 11:
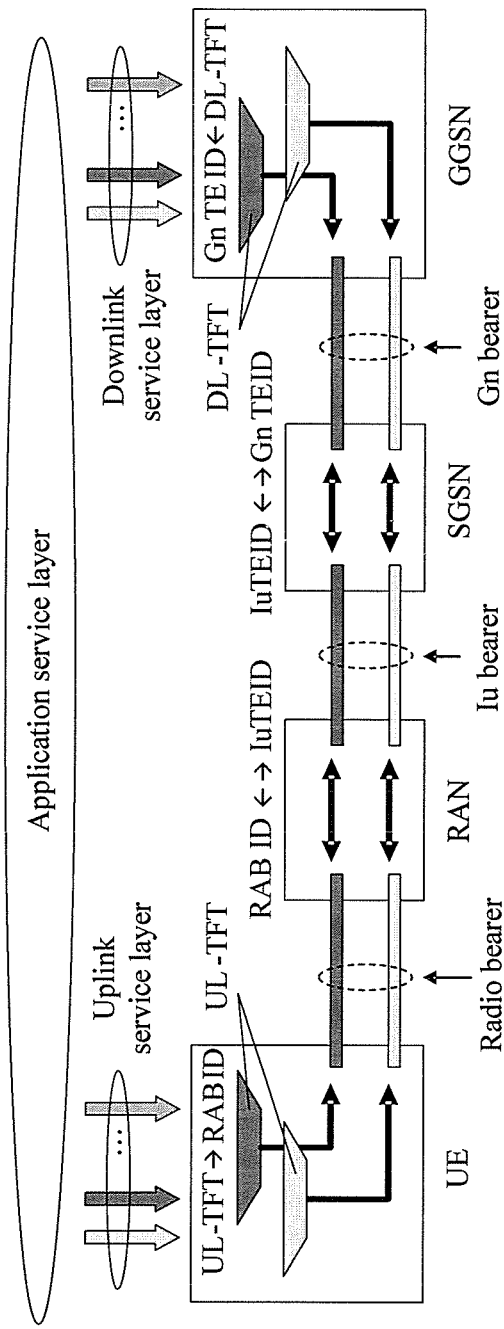
FIG. 11 is a schematic diagram of a UMTS bearer in a PS domain according to an embodiment of the present invention.

FIG. 11 is a schematic diagram of a UMTS bearer in a PS domain according to an embodiment of the present invention. As shown in FIG. 11, the UMTS bearer in the uplink direction or downlink direction is composed of the radio bearer from the UE to the RAN (Radio Access Network, radio access network, including the Node B and RNC), the Iu bearer from the RAN to the SGSN, and the Gn bearer from the SGSN to the GGSN, and is connected to the external PDN (typically an IP network) through the GGSN and arrives at the opposite application layer. The radio bearer (Radio Bearer, RB) from the UE to the RAN and the Iu bearer from the RAN to the SGSN are collectively called a radio access bearer (Radio Access Bearer, RAB), and the Iu bearer from the RAN to the SGSN and the Gn bearer from the SGSN to the GGSN are collectively called a PDP context (packet data protocol context).

In the uplink direction, the UE uses an uplink TFT (UL-TFT) to match each packet from the application layer, and therefore, the data is separated into different uplink IP flows, which are then sent through corresponding uplink UMTS bearers. Therefore, the UE saves an identifier that uniquely corresponds to each uplink UMTS bearer of the UE, namely, an uplink RAB ID. The RNC also corresponds to an uplink UMTS bearer of the UE by using the uplink RAB ID, and stores the GTP-U tunnel identifier of the Iu interface that uniquely corresponds to the uplink RAB ID. Therefore, when the UE is connected to multiple PDNs simultaneously, an uplink RAB ID uniquely corresponds to an uplink IP data flow of a PDN connection.

In the downlink direction, the downlink packets of the opposite application layer pass through the external packet data network and arrive at the GGSN. Then, the GGSN uses a downlink TFT (DL-TFT) to match each downlink packet, and therefore, the data is separated into different downlink IP flows, which are then sent through the corresponding downlink UMTS bearers. Similarly, the RNC and the UE correspond to the downlink UMTS bearer of the UE by using the downlink RAB ID, and the RNC also stores the GTP-U tunnel identifier of the Iu interface that uniquely corresponds to the downlink RAB ID. Therefore, when the UE is connected to multiple PDNs simultaneously, a downlink RAB ID uniquely corresponds to a downlink IP data flow of a PDN connection.

In an embodiment, the UMTS bearer in the PS domain is created in a PDP Context activation procedure, and may be modified in a PDP Context modification procedure, and may be deleted in a PDP Context deactivation procedure. The same PDN connection of a UE includes at least one UMTS bearer. That is, multiple PDP Contexts may be created for the same PDN connection of a UE. In an embodiment, the PDP Context stores all information on tunnel forwarding of the user data between the GGSN, the SGSN, and the RNC. The information includes the user plane IP addresses of the GGSN, SGSN, and RNC, and also the GTP-U tunnel identifier. Only when the PDP Context is active, the GTP-U tunnel of the Iu interface and the Gn interface is open and the user's data packets can be transmitted between the RNC and the GGSN. It should be noted that the active or inactive state of the PDP Context is controlled by a NAS (non-access stratum), and is independent of the state of the radio air interface, no matter whether the radio air interface is a UMTS air interface or not.

If the UE has no static IP address, the IP address of the UE is allocated by the network at the time of creating the first PDP Context. Different PDP Contexts of the same PDN connection have the same IP address. That is, the IP address of the UE refers to the IP address of the UE in the corresponding PDN connection (that is, the IP address of the UE in the corresponding PDN). For example, if a UE is connected to two PDNs, the IP address of the UE refers to the IP address of the UE in the two PDNs respectively. In the following embodiments, the IP address of the UE has the same meaning. The IP addresses in different PDNs are independent of each other. Therefore, when a UE is connected to multiple PDNs simultaneously, it is possible that the IP addresses of the same UE in different PDNs are the same.

Therefore, in the data offloading and converging method provided in the embodiment of the present invention, the control plane (Control Plane) function of the UMTS network creates one or more PDP Contexts of the user plane (User Plane) according to a standard UMTS protocol. In the downlink direction, the RNC maps each PDP Context to the radio link of the UMTS, or the radio link of the WLAN, or both the radio link of the UMTS and the radio link of the WLAN; in the uplink direction, the UE maps each PDP Context to the radio link of the UMTS, or the radio link of the WLAN, or both the radio link of the UMTS and the radio link of the WLAN. Therefore, control plane messages (including NAS (non-access stratum) and AS (access stratum) messages) are still transmitted over a UMTS channel, but the user data may be partially or completely transmitted over a WLAN radio bearer. That is, the user data may be transmitted through a WLAN radio bearer and/or a UMTS channel.

The following describes two solutions to data offloading and converging according to an embodiment of the present invention.

Solution 1:

In an embodiment of solution 1, the GGSN/UE separates the IP flows based on a TFT, and reuses the existing IP flow bearing mechanism of the UMTS:

In the Downlink Direction:

1. The GGSN uses the existing DL-TFT function to separate the downlink data flows of the UE into different downlink IP flows, and each downlink IP flow passes through the corresponding downlink GTP-U tunnel in the core network to arrive at the RNC.

2. The RNC connects a part or all of the downlink GTP-U tunnels that bear the downlink IP flows to the corresponding downlink WLAN radio bearers, and connects the remaining part of the downlink GTP-U tunnels that bear the downlink IP flows to the corresponding downlink UMTS radio bearers.

In this way, a part or all of the downlink IP flows are offloaded to the WLAN air interface, and the downlink user data is offloaded and converged on the air interfaces of the UMTS and the WLAN for transmission.

In the Uplink Direction:

1. The UE uses the existing UL-TFT function to separate the uplink data flows of the UE into different uplink IP flows.

2. The UE sends a part or all of the uplink IP flows through the corresponding uplink WLAN radio bearers, and sends the remaining part of the uplink IP flows through the corresponding uplink UMTS radio bearers.

3. The RNC connects a part or all of the uplink GTP-U tunnels that bear the uplink IP flows to the corresponding uplink WLAN radio bearers, and connects the remaining part of the uplink GTP-U tunnels that bear the uplink IP flows to the corresponding uplink UMTS radio bearers.

4. The RNC forwards a part or all of the uplink IP flows passing through the uplink WLAN radio bearers to the corresponding uplink GTP-U tunnels, and forwards the remaining part of the uplink IP flows passing through the uplink UMTS radio bearers to the corresponding uplink GTP-U tunnels. In this way, the uplink user data is offloaded and converged at the air interfaces of the UMTS and the WLAN for transmission.

To sum up, the RNC needs to connect a part or all of the GTP-U tunnels of the UE to the WLAN radio bearers of the UE, and the connecting includes: in the uplink direction, connecting a part or all of the GTP-U tunnels that bear the uplink IP flows to the corresponding uplink WLAN radio bearers, and connecting the remaining part of the GTP-U tunnels that bear the uplink IP flows to the corresponding uplink UMTS radio bearers; and, in the downlink direction, connecting a part or all of the GTP-U tunnels that bear the downlink IP flows to the corresponding downlink WLAN radio bearers, and connecting the remaining part of the GTP-U tunnels that bear the downlink IP flows to the corresponding downlink UMTS radio bearers.

In an embodiment, the RNC and the WLAN AP create a mapping relationship between the MAC address of the UE and the UDP port number of the user plane interface that is between the RNC and the WLAN AP.

In an embodiment, the WLAN AP uses the MAC address of the UE to uniquely identify a UE, and the user plane interface between the RNC and the WLAN AP may use the UDP port number to differentiate between UEs. Therefore, the RNC and the WLAN AP may create a mapping relationship between the MAC address of the UE and the UDP port number of the user plane interface that is between the RNC and the WLAN AP.

In this way, all the UE's uplink data packets from this MAC address are received by the WLAN AP and sent to the RNC through the corresponding UDP port; according to the mapping relationship between the MAC address of the UE and the UDP port number of the user plane interface that is between the RNC and the WLAN AP, the RNC maps the uplink data packets to the corresponding bearer channel of the UE (namely, a GTP-U tunnel) by using the UDP port number.

In an embodiment, according to the mapping relationship between the MAC address of the UE and the UDP port number of the user plane interface that is between the RNC and the WLAN AP, the RNC sends the UE's downlink data packets, which need to be transmitted through the WLAN air interface, to the WLAN AP through the UDP port; and the WLAN AP receives the downlink data packets that are from the RNC and transmitted through a specific UDP port, finds the corresponding MAC address of the UE according to the UDP port number, and then sends the downlink data packets to the UE having the corresponding MAC address through the WLAN air interface.

In an embodiment, the RNC creates the mapping relationship between the MAC address of the UE and every bearer channel of the UE:

As described above, the RNC can obtain only the UDP port number or the MAC address of the UE from the interface between the RNC and the WLAN AP. To map to the corresponding bearer channel (namely, a GTP-U tunnel) of the UE, the RNC needs to create the mapping relationship between the MAC address of the UE and every bearer channel (namely, a GTP-U tunnel) of the UE.

Therefore, through application layer offloading control signaling between the UE and the RNC, the UE sends its IMSI (International Mobile Subscriber Identity, international mobile subscriber identity) and MAC address to the RNC.

The IMSI is a unique identifier of a UE in the cellular network, and the RNC stores the mapping relationship between the IMSI of each UE and every bearer channel (namely, a GTP-U tunnel) of the UE.

Therefore, after receiving the IMSI and MAC address of the UE through the application layer offloading control signaling between the UE and the RNC, the RNC creates the mapping relationship between the MAC address of the UE and every bearer channel (namely, a GTP-U tunnel) of the UE by using the IMSI and MAC address of the UE.

In an embodiment, when transmitting data through the WLAN air interface, the RNC also needs to create a mapping relationship between the end-to-end tunnel and the bearer of the UE:

In an embodiment, the WLAN air interface does not differentiate a part or all of the UE's IP flows transmitted through the WLAN air interface. Therefore, to enable the UE to distinguish between the UE's different IP flows transmitted through the WLAN air interface in the downlink direction and to enable the RNC to distinguish between different IP flows of the UE in the uplink direction and send the IP flows to the corresponding GTP-U tunnels, the RNC and the UE need to create consistent mapping relationships between a part or all of the IP flows transmitted through the WLAN air interface and the corresponding bearers.

Therefore, in an embodiment of the present invention, multiple end-to-end tunnels are set up between the UE and the RNC. One end-to-end tunnel bears one of the UE's IP flows transmitted through the WLAN air interface. According to the tunnel number of the end-to-end tunnel between the UE and the RNC, the RNC and the UE can determine the mapping relationships between a part or all of the IP flows transmitted through the WLAN air interface and the corresponding bearers.

In the existing UMTS system, both the UE and the RNC store an identifier of the UMTS bearer of each UE, namely, an RAB ID and an RB ID. The RAB ID corresponds to the RB ID on a one-to-one basis, and corresponds to the UMTS bearer. That is, the RNC and the UE can determine the mapping relationships between a part or all of the IP flows transmitted through the WLAN air interface and the corresponding bearers only if the UE and the RNC have negotiated the following mapping relationship through the application layer offloading control signaling between the UE and the RNC: the mapping relationship between the tunnel numbers of end-to-end tunnels and the RAB IDs or RB IDs of the corresponding bearers, where the end-to-end tunnels exist between the UE and the RNC and bear a part or all of IP flows transmitted through the WLAN air interface.

In this way, in the uplink direction, the RNC may distinguish between different PDN connections of the same UE and distinguish between uplink IP flows of different PDP Contexts of the same PDN connection according to the tunnel number so that the flows can be sent to the SGSN through the corresponding GTP-U tunnel of the Iu interface; in the downlink direction, the RNC sends the UE's downlink IP flows from different GTP-U tunnels to the UE through the WLAN air interface, and the IP flows pass through the corresponding end-to-end tunnels between the UE and the RNC. In this way, the UE may distinguish between different PDN connections of the UE according to the tunnel number of the end-to-end tunnel between the UE and the RNC.

Figure 12:
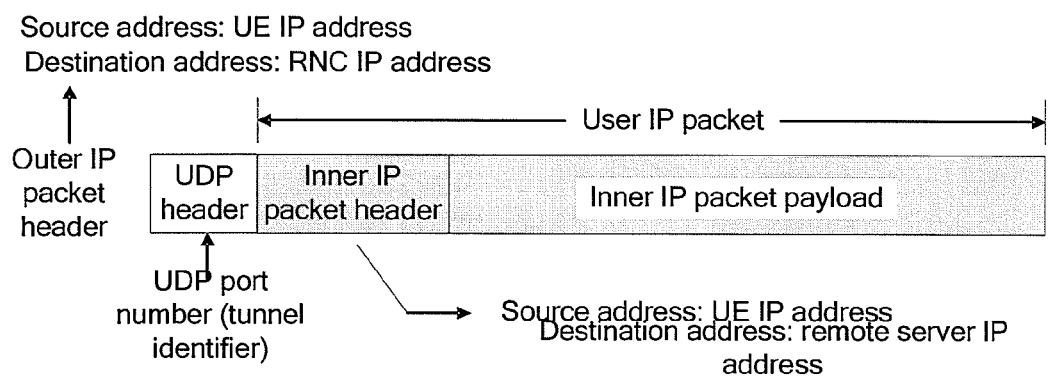
FIG. 12 is a schematic diagram of an end-to-end tunneling way for a UE and an RNC according to an embodiment of the present invention.

As shown in FIG. 12, an embodiment provides an end-to-end tunneling way between the UE and the RNC. According to FIG. 12, a user IP packet (namely, an inner IP packet) is encapsulated into an outer UDP/IP packet. For the IP packet in the uplink direction, the source address of the header of the user IP packet (namely, the header of the inner IP packet in FIG. 12) is the IP address of the UE, and the destination address is the IP address of a remote server. The source address of the header of the outer IP packet is the IP address of the UE, the destination address is the IP address of the serving RNC of the UE, and the UDP port number of the UDP header of the outer IP packet is the tunnel number of the end-to-end tunnel.

Figure 13:
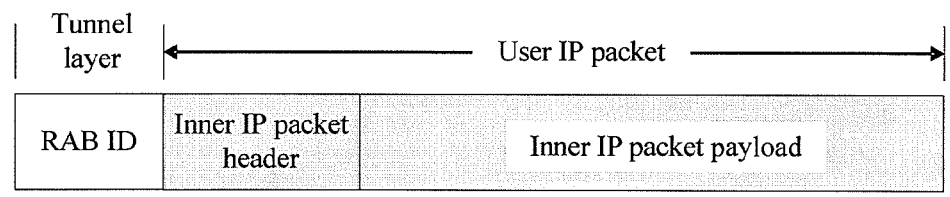
FIG. 13 is a schematic diagram of an end-to-end tunneling way for a UE and an RNC according to an embodiment of the present invention.

As shown in FIG. 13, an embodiment of the present invention provides another end-to-end tunneling way between the UE and the RNC, which is different from the end-to-end tunneling way between the UE and the RNC in FIG. 12 in that: in this embodiment, the user IP packet is preceded by a tunnel layer field for indicating the RAB ID of the bearer corresponding to the end-to-end tunnel.

Optionally, in an embodiment, an IPSec (Internet Protocol Security, Internet Protocol Security) protocol is used to encrypt the end-to-end tunnel between the UE and the RNC to ensure data security.

However, in other embodiments, the end-to-end tunnel between the UE and the RNC may be implemented in other ways than those shown in FIG. 12 and FIG. 13. For example, the tunneling is implemented through protocols such as IPSec and IEEE 802.2 LLC (Logical Link Control, Logical Link Control), which are not restricted in the embodiment of the present invention.

Figure 14:
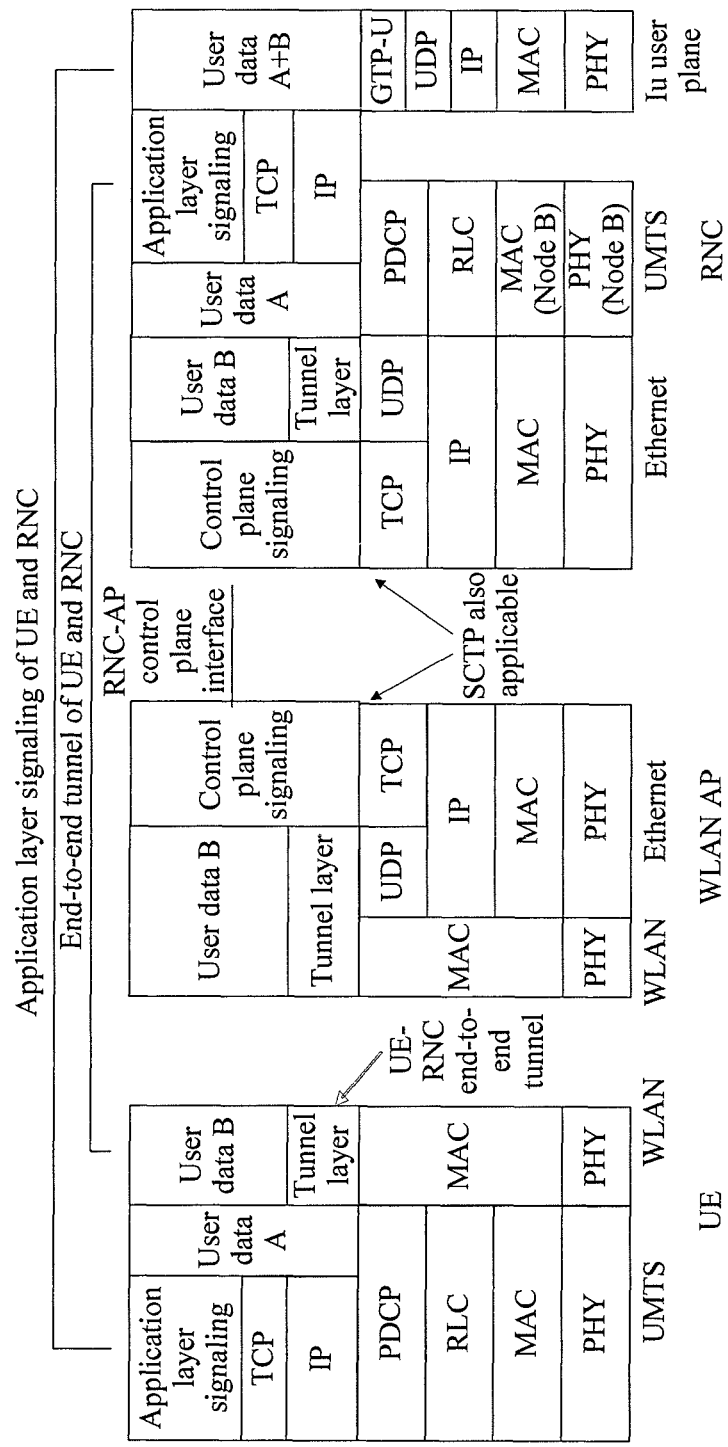
FIG. 14 is a schematic diagram of a protocol stack according to an embodiment of the present invention.

In an embodiment, as shown in FIG. 14, a protocol stack related to the present invention and designed for the UE, WLAN AP, and RNC is provided. Evidently, a part of user data ("user data A" shown in FIG. 14) is transmitted through the UMTS air interface. Meanwhile, the UMTS air interface is responsible for transmitting the application layer offloading control signaling between the UE and the RNC. The application layer offloading control signaling may be transmitted through the TCP protocol. The WLAN air interface transmits the remaining part of the user data ("user data B" shown in FIG. 14). As described above, this part of user data is transmitted through the end-to-end tunnel between the UE and the RNC. The data plane interface between the RNC and the WLAN AP implements transmission through UDP/IP, and the control plane interface implements transmission through TCP/IP or SCTP/IP.

The WLAN AP uses the MAC address of a UE to uniquely identify the UE, and the UDP port number of the data plane interface between the RNC and the WLAN AP distinguishes between different UEs. Therefore, both the WLAN AP and the RNC store the mapping relationship between the MAC address of the UE and the UDP port number of the data plane interface that connects the RNC with the WLAN AP. In this way, all uplink data packets from this MAC address are received by the WLAN AP and sent to the RNC through the corresponding UDP port; meanwhile, the WLAN AP receives the downlink data packets that are from the RNC and transmitted through a specific UDP port, and finds the corresponding MAC address of the UE according to the UDP port, thereby sending the downlink data packets to the UE having this MAC address.

Finally, all user data ("user data A+B" in FIG. 14) is transmitted between the RNC and the SGSN through the user plane GTP-U tunnel of the Iu interface.

According to FIG. 14, the UMTS air interface also serves to transmit the application layer offloading control signaling between the UE and the RNC. This signaling may be transmitted through the TCP protocol.

The UE and the RNC may identify the application layer offloading control signaling in the first way: the system allocates a dedicated bearer channel to the application layer offloading control signaling, and therefore, for any information transmitted over this dedicated bearer, the UE and the RNC can handle the information as application layer offloading control signaling.

The UE and the RNC may identify the application layer offloading control signaling in the second way: identify the application layer offloading control signaling by using the UE-side address or the RNC-side IP address from which the application layer offloading control signaling is transmitted.

In an embodiment, the UE-side address may be the IP address obtained by the UE at the time of creating a PDP Context; and the RNC-side IP address may be a specific IP address configured by the system (the UE may obtain the IP address of the serving RNC through the DNS (domain name server)).

In this case, when the RNC receives an IP packet whose destination address is the specific IP address, the IP packet is regarded as carrying the application layer offloading control signaling from the UE; also, when the UE receives an IP packet whose source address is the specific IP address, the IP packet is regarded as carrying the application layer offloading control signaling from the RNC. The specific IP address is located in the IP address space of the external PDN. To avoid confusing the application layer offloading control signaling and the data packet of the UE, the specific IP address may be a reserved IP address. Taking IPv4 as an example, the specific IP address may be an address between 192.168.0.0 and 192.168.255.255.

The UE and the RNC may identify the application layer offloading control signaling in the third way: identify the application layer offloading control signaling by using the UE-side address or the RNC-side IP address from which the application layer offloading control signaling is transmitted, or through the TCP protocol that uses a specific TCP port to transmit the application layer offloading control signaling.

In an embodiment, the UE-side address may be the IP address obtained by the UE at the time of creating a PDP Context; and the RNC-side IP address may be a specific IP address configured by the system (the UE may obtain the IP address of the serving RNC through the DNS).

When the RNC receives an IP packet whose destination address is the specific IP address, and if the TCP port number is the number of the specific TCP port, this TCP-over-IP packet is regarded as carrying the application layer offloading control signaling from the UE; also, when the UE receives an IP packet whose source address is the specific IP address, and if the TCP port number is the specific TCP port number, the TCP-over-IP packet is regarded as carrying the application layer offloading control signaling from the RNC. The specific IP address is located in the IP address space of the external PDN. To avoid confusing the application layer offloading control signaling with the data packet of the UE, the specific IP address may be a reserved IP address. Taking IPv4 as an example, the specific IP address may be an address between 192.168.0.0 and 192.168.255.255, and the specific TCP port is a infrequently used TCP port (for example, 0-1024 are frequently used TCP port numbers).

I. The following embodiment describes the procedure for setting up convergent transmission of the UMTS and WLAN.

1. First, if the UE has uplink data that needs to be transmitted but the PDP Context is inactive, the UE initiates a PDP Context activation procedure through a UMTS air interface, obtains the IP address of the corresponding PDN connection, and creates at least one UMTS bearer. If the user enables the WLAN offloading function, the UE and the RNC may use the UMTS bearer to initiate an application layer offloading control signaling procedure between the UE and the RNC, thereby setting up convergent transmission of the UMTS and the WLAN.

2. The RNC may use the application layer offloading control signaling to notify the UE that an accessible WLAN AP exists at the current location, thereby starting the WLAN function module and getting ready to initiate WLAN offloading. The RNC may also use the application layer offloading control signaling to notify the UE that no accessible WLAN AP exists at the current location, and therefore, the WLAN function module is shut down to reduce power consumption of the UE.

The WLAN APs are generally distributed in hotspot areas and provide discontinuous coverage. Therefore, if the UE keeps starting the WLAN transceiving module, it may cause unnecessary power consumption. Further, the RNC can obtain the UE location information. For example, the RNC can know the cell in which the UE is located and know, through radio measurement on the UMTS air interface, whether the UE is located at the center of the cell or at the edges of several neighboring cells. Therefore, the RNC may use the application layer offloading control signaling to notify the UE that an accessible WLAN AP exists at the current location, thereby starting the WLAN function module and getting ready to initiate the WLAN offloading. The RNC may also use the application layer offloading control signaling to notify the UE that no accessible WLAN AP exists at the current location (for example, the UE leaves the hotspot area of the WLAN, or the WLAN restricts user access due to serious interference or overload), thereby shutting down the WLAN function module to reduce the power consumption of the UE.

3. After detecting an accessible WLAN AP, the UE can obtain the BSSID (basic service set identifier) of the WLAN AP. The BSSID serves to identify the WLAN AP uniquely.

4. By using the application layer offloading control signaling between the UE and the RNC, the UE sends to the RNC the BSSID of the WLAN AP with which the UE attempts to associate; further, the UE may send its MAC address to the RNC through the application layer offloading control signaling between the UE and the RNC.

Generally, the BSSID of a WLAN AP is the MAC address of the WLAN AP. The RNC stores a list of BSSIDs of all WLAN APs connected to the RNC. In this way, by using the application layer offloading control signaling between the UE and the RNC, the UE may send to the RNC the MAC address of the UE and the BSSID of the WLAN AP with which the UE attempts to associate.

5. The RNC matches the BSSID with a locally stored list of BSSIDs of connected WLAN APs; if the matching fails, the RNC instructs the UE not to initiate an association with the WLAN AP; if the matching succeeds, the RNC instructs the UE to initiate an association with the WLAN AP and initiate a WLAN authentication procedure.

In an embodiment, the WLAN authentication procedure may apply an SIM-based or USIM-based authentication way. The detailed procedure is defined in the IETF specifications such as RFC4186 and RFC4187.

In an embodiment, the WLAN authentication procedure may be an automatic authentication way based on the WLAN MAC address of the UE or based on the WLAN MAC address and the IP address of the UE. Specifically, the UE sends application layer offloading control signaling to the RNC, where the signaling carries the WLAN MAC address of the UE, and optionally, the IP address of the UE. The RNC sends the WLAN MAC address of the UE, and optionally, the IP address of the RNC to the associated WLAN AP whose BSSID is matched successfully. In addition, through the application layer offloading control signaling between the UE and the RNC, the UE negotiates with the RNC about the encryption algorithm of the WLAN air interface and the key of the encryption algorithm. The RNC sends the negotiated encryption algorithm and the key of the encryption algorithm of the WLAN air interface to the associated WLAN AP whose BSSID is matched successfully. In this way, the WLAN AP sets up a binding relationship between the WLAN MAC address of the UE and the key of the encryption algorithm, or a binding relationship between the WLAN MAC address and IP address of the UE and the key of the encryption algorithm. As a result, the WLAN AP regards the UE as legal and permits the access of the UE only if the UE fulfills the binding relationship.

6. After the UE is associated with the WLAN AP and authenticated successfully, the UE notifies the RNC, through application layer offloading control signaling between the UE and the RNC, or through a control plane interface between the WLAN AP and the RNC, that the UE (identified by a MAC address) has accessed the WLAN AP. Therefore, the RNC stores the mapping relationship between the UE and the BSSID of the accessed WLAN AP.

In an embodiment, when the UE is associated with another WLAN AP connected to the RNC due to movement of the UE, the RNC updates the mapping relationship between the UE and the BSSID of the new WLAN AP accessed by the UE. By using this mapping relationship, the RNC can always send the downlink user data offloaded to the WLAN to the WLAN AP currently accessed by the UE, and then the WLAN AP sends the user data to the UE.

II. Through the application layer offloading control signaling between the UE and the RNC, the UE and the RNC make the following preparations for setting up convergent transmission of the UMTS and the WLAN:

(1) The UE sends its IMSI and MAC address to the RNC through the application layer offloading control signaling between the UE and the RNC, and the RNC creates the mapping relationship between the MAC address of the UE and every bearer channel (namely, a GTP-U tunnel) of the UE by using the IMSI and MAC address of the UE.

(2) Further, the UE negotiates and determines a data offloading policy of the UE through the application layer offloading control signaling between the UE and the RNC.

In an embodiment, the data offloading policy may be: for the uplink direction and downlink direction respectively, determining which IP flows (which correspond to the RAB ID, RB ID, and GTP-U tunnel identifier on a one-to-one basis respectively) are to be transmitted through the WLAN air interface (and the remaining part is transmitted through the UMTS air interface). For example, if four PDP Contexts are created for a PDN connection of a UE and correspond to four IP flows respectively, the negotiation concludes that the first and the fourth IP flows are transmitted through the WLAN air interface, and the second and third IP flows are transmitted through the UMTS air interface.

Further, in an embodiment, the data offloading policy may include a percentage or priority level of the data traffic transmitted through the UMTS air interface against the data traffic transmitted through the WLAN air interface. For example, if the tariff policy of the operator specifies that the WLAN access is free of charge or the tariff of the WLAN traffic is lower than that of the UMTS traffic, the user prefers the WLAN as a means of transmitting data; when the battery is low, the user prefers the energy-efficient air interface as a means of transmitting data to prolong the battery life of the terminal. The system makes further selection according to certain principles on the basis of user selection. For example, the system may make selection according to the congestion of the two air interfaces. When the WLAN interference is great, which leads to a sharp decrease of the transmission rate, the system offloads the traffic to the UMTS air interface on the basis of the user selection.

(3) The UE and the RNC may negotiate, through the application layer offloading control signaling between the UE and the RNC, the mapping relationship between the tunnel numbers of end-to-end tunnels and the RAB IDs or RB IDs of the corresponding bearers, where the end-to-end tunnels exist between the UE and the RNC and bear a part or all of IP flows transmitted through the WLAN air interface. As described above, according to this mapping relationship, the RNC and the UE can determine the mapping relationships between a part or all of the IP flows transmitted through the WLAN air interface and the corresponding bearers.

(4) Through the control plane interface between the RNC and the WLAN AP, the RNC and the WLAN AP accessed by the UE negotiate a UDP port number used by the user plane interface between the RNC and the WLAN AP to transmit the uplink data and/or downlink data of the UE. The WLAN AP and the RNC may create a mapping relationship between the MAC address of the UE and the UDP port number of the user plane interface that is between the RNC and the WLAN AP.

After the foregoing operations are finished, convergent transmission of the UMTS and the WLAN may begin.

As described above, in the uplink direction, the UE uses the UL-TFT function to separate the uplink data flows of the UE into different uplink IP flows.

According to the data offloading policy negotiated with the RNC, the UE maps a part or all of the uplink IP flows, which need to be transmitted through the WLAN air interface, to corresponding end-to-end tunnels between the UE and the RNC respectively, and then the IP flows are sent to the WLAN AP through the WLAN air interface.

The WLAN AP sends all the uplink data packets from the UE having this MAC address to the RNC through the corresponding UDP port.

The RNC uses the UDP port number to find the corresponding bearer channel (namely, a GTP-U tunnel) of the UE according to the mapping relationship between the MAC address of the UE and the UDP port number of the user plane interface that is between the RNC and the WLAN AP, and, according to the mapping relationship between the GTP-U tunnel of the part or all of the IP flows and the tunnel number of the end-to-end tunnel that connects the UE with the RNC, forwards the part or all of the IP flows to the corresponding uplink GTP-U tunnels respectively. Meanwhile, the UE sends the remaining part of the uplink IP flows to the RNC through the corresponding uplink UMTS radio bearers according to existing UMTS standards, and then the RNC forwards the IP flows to the corresponding uplink GTP-U tunnels respectively. In this way, convergent transmission of the uplink user data is implemented at the air interfaces of the UMTS and the WLAN.

In the downlink direction, the GGSN uses a DL-TFT function to separate the downlink data flows of the UE into different downlink IP flows, and the downlink IP flows pass through the corresponding downlink GTP-U tunnels to arrive at the RNC.

According to the data offloading policy negotiated with the UE, the RNC maps a part or all of the downlink IP flows to the corresponding end-to-end tunnels between the UE and the RNC respectively, and then the IP flows are sent to the WLAN AP through the corresponding UDP port.

By using the UDP port number, the WLAN AP sends all the UE's downlink data packets from the UDP port to the UE having the MAC address through the WLAN air interface according to the mapping relationship between the MAC address of the UE and the UDP port number of the user plane interface that is between the RNC and the WLAN AP.

The UE differentiates IP flows of different PDN connections of the UE according to the mapping relationship between the part or all of the IP flows and the tunnel number of the end-to-end tunnel that connects the UE with the RNC. Meanwhile, according to the existing UMTS standards, the RNC sends the remaining part of the downlink IP flows to the UE through the corresponding downlink UMTS radio bearers. In this way, convergent transmission of the downlink user data is implemented at the air interfaces of the UMTS and the WLAN.

In addition, when the UE is to leave the current serving RNC due to the movement of the UE, the RNC receives an RNC relocation (RNC Relocation) request from the UE. Before deciding to start RNC relocation, the RNC reconfigures the offloading, that is, reconfigures the user data flows previously offloaded to the WLAN as being transmitted by the UMTS; and, through the application layer offloading control signaling between the UE and the RNC, the RNC instructs the UE to cancel the association with the currently accessed WLAN AP, or, through the control plane interface between the RNC and the WLAN AP, the RNC instructs the WLAN AP currently accessed by the UE to cancel the association with the UE. After the association is cancelled successfully, the RNC starts an RNC relocation procedure. After the RNC relocation is completed and the UE hands over to a new RNC, if a WLAN AP is currently accessible, the UE repeats the foregoing procedure to access the WLAN AP connected to the current serving RNC, thereby setting up convergent transmission of the UMTS and the WLAN again.

It should be noted that, in addition to the offloading control between the UE and the RNC based on application layer signaling carried on the user plane as described above, offloading control may be implemented by directly extending the RRC (radio resource control) protocol between the UE and the S-GW (serving gateway) in the existing standards to add functions of the application layer offloading control signaling between the UE and the S-GW according to the present invention. That is, the RRC signaling is used to transmit the information related to offloading control between the UE and the RNC in an embodiment of the present invention. In this case, the RRC signaling that transmits the information related to offloading control between the UE and the RNC is known as RRC offloading control signaling.

According to the foregoing technical solution of the embodiment of the present invention, the data offloading and converging node replaces the UMTS radio bearers partially or completely with the WLAN radio bearer, in which the data offloading and converging node is fully transparent to the core network; and the WLAN access is implemented without the need of modifying the cellular network, which reduces the period and cost of network construction. The WLAN radio bearer may serve as a technology of enhancing radio air interfaces to improve data transmission rates greatly, enhance the user experience, and improve quality of service of the mobile communication network.

Solution 2:

In an embodiment of solution 2, the IP flows are separated by a built-in packet filter of the RNC or an external packet filter of the UE:

In this embodiment, only one PDP Context is created for a PDN connection of the UE, that is, only one GTP-U tunnel exists between the GGSN and the RNC.

In the downlink direction, the DL-TFT function of the GGSN is not used to separate the downlink data flows of the UE.

1. The built-in packet filter in the RNC separates the downlink data flows of each PDN connection of the UE into different downlink IP flows (IP Flow).

2. According to the data offloading policy negotiated with the UE, the RNC sends a part or all of the downlink IP flows to the WLAN AP, and therefore, this part of downlink IP flows are transmitted to the UE through the WLAN air interface, and the remaining part of the downlink IP flows are transmitted to the UE through the UMTS air interface. In this way, the downlink user data is offloaded and converged at the UMTS air interface and the WLAN air interface for transmission.

In the Uplink Direction:

1. The UE uses an external packet filter of a UMTS transceiving module (generally an independent ASIC (application-specific integrated circuit) chip) to separate the uplink data flows of each PDN connection from the application layer into different uplink IP flows.

2. According to the data offloading policy negotiated with the RNC, the UE sends a part or all of the uplink IP flows to a WLAN AP through a WLAN air interface.

3. The WLAN AP further transmits the part or all of the uplink IP flows to the RNC, and transmits the remaining part of the uplink IP flows to the RNC through a UMTS air interface.

4. The RNC forwards all uplink IP flows of the PDN connection from the WLAN air interface and the UMTS air interface to the uplink GTP-U tunnel corresponding to the PDN connection. In this way, the uplink user data is offloaded and converged at the air interfaces of the UMTS and the WLAN for transmission.

In an embodiment, the RNC and the WLAN AP create a mapping relationship between the MAC address of the UE and the UDP port number of the user plane interface that is between the RNC and the WLAN AP.

In an embodiment, the WLAN AP uses the MAC address of the UE to uniquely identify a UE, and the user plane interface between the RNC and the WLAN AP may use the UDP port number to differentiate between UEs. Therefore, the RNC and the WLAN AP may create a mapping relationship between the MAC address of the UE and the UDP port number of the user plane interface that is between the RNC and the WLAN AP.

In this way, all the UE's uplink data packets from this MAC address are received by the WLAN AP and sent to the RNC through the corresponding UDP port; according to the mapping relationship between the MAC address of the UE and the UDP port number of the user plane interface that is between the RNC and the WLAN AP, the RNC maps the uplink data packets to the corresponding bearer channel of the UE (namely, a GTP-U tunnel) by using the UDP port number.

In an embodiment, according to the mapping relationship between the MAC address of the UE and the UDP port number of the user plane interface that is between the RNC and the WLAN AP, the RNC sends the UE's downlink data packets, which need to be transmitted through the WLAN air interface, to the WLAN AP through the UDP port; and the WLAN AP receives the downlink data packets that are transmitted through a specific UDP port from the RNC, finds the corresponding MAC address of the UE according to the UDP port number, and then sends the downlink data packets to the UE having the corresponding MAC address through the WLAN air interface.

In an embodiment, the RNC creates the mapping relationship between the MAC address of the UE and the bearer channel:

As described above, the RNC can obtain only the UDP port number or the WLAN MAC address of the UE from the interface between the RNC and the WLAN AP. To map to the corresponding bearer channel (namely, a GTP-U tunnel) of the UE, the RNC needs to create the mapping relationship between the WLAN MAC address of the UE and every bearer channel (namely, a GTP-U tunnel) of the UE. In this embodiment, only one PDP Context is created for a PDN connection of the UE, that is, although only one GTP-U tunnel exists between the GGSN and the RNC, because the UE may be connected to multiple PDNs simultaneously, one UE in the RNC may still correspond to multiple GTP-U tunnels.

Therefore, through application layer offloading control signaling between the UE and the RNC, the UE sends its IMSI and MAC address to the RNC.

The IMSI is a unique identifier of a UE in the cellular network, and the RNC stores the mapping relationship between the IMSI of each UE and every bearer channel (namely, a GTP-U tunnel) of the UE.

Therefore, after receiving the IMSI and MAC address of the UE through the application layer offloading control signaling between the UE and the RNC, the RNC creates the mapping relationship between the MAC address of the UE and every bearer channel (namely, a GTP-U tunnel) of the UE by using the IMSI and WLAN MAC address of the UE.

In an embodiment, different PDN connections of the same UE need to be distinguished:

As mentioned above, although only one PDP Context is created for a PDN connection of the UE, that is, only one GTP-U tunnel exists between the GGSN and the RNC, because the UE may be connected to multiple PDNs simultaneously, one UE in the RNC may still correspond to multiple GTP-U tunnels, and, on the UE side, different PDN connections of the same UE need to be distinguished so that the uplink data of the corresponding PDN connection can be sent to a corresponding application layer. For the IP flows sent from the UE and transmitted through the WLAN air interface, the WLAN AP is unable to distinguish the IP flows over different PDN connections of the same UE, and therefore, the RNC and the UE require a method for distinguishing the IP flows over different PDN connections of the same UE.

Therefore, in an embodiment, the IP address is used to distinguish the IP flows over different PDN connections of the same UE. Specifically, the IP addresses in different PDNs are independent of each other, therefore, when a UE is connected to multiple PDNs simultaneously, it is possible that the IP addresses allocated to the same UE for use in different PDN connections are the same. Therefore, the IP address allocated for use in different PDN connections should not be the same so that the IP address can be used to distinguish between different PDN connections of the same UE. In a practical system, because the IP address space is enormous, it is hardly possible that two or more PDNs allocate the same IP address to the same UE; if the IP address allocated for the second PDN connection is the same as the IP address allocated for the first PDN connection, the UE may require the network to allocate another IP address for the second PDN connection to avoid such special circumstances.

In this way, the data may be transmitted through the UMTS air interface first, and the UE resolves the user IP packet on each downlink UMTS bearer of the UE to obtain the destination address (namely, the IP address of the corresponding PDN connection of the UE), and creates a mapping relationship between the IP address of every PDN connection of the UE and the corresponding application layer; the RNC resolves the user IP packet on each uplink UMTS bearer of the UE to obtain the source address (namely, the IP address of the corresponding PDN connection of the UE), and creates a mapping relationship between the IP address of every PDN connection of the UE and the corresponding GTP-U tunnel. After the RNC and the UE finish setting up the mapping relationships, by using application layer offloading control signaling between the UE and the RNC, a part or all of the uplink and/or downlink IP flows are transmitted through the WLAN air interface, and thus convergent transmission of the UMTS and the WLAN is set up.

FIG. 14 is a schematic diagram of a protocol stack related to the present invention and designed for the UE, WLAN AP, and RNC, which is also applicable to solution 2.

As shown in FIG. 14, a part of user data ("user data A" shown in the figure) is transmitted through a UMTS air interface, and the remaining part of user data ("user data B" shown in the figure) is transmitted through a WLAN air interface. The data plane interface between the RNC and the WLAN AP implements transmission through the way of UDP over IP, and the control plane interface implements transmission through the way of TCP over IP or SCTP over IP. Finally, all user data ("user data A+B" shown in the figure) is transmitted between the RNC and the SGSN through the user plane GTP-U tunnel of the Iu interface.

The UMTS air interface also serves to transmit the application layer offloading control signaling between the UE and the RNC. This signaling may be transmitted through the TCP protocol.

The UE and the RNC may identify the application layer offloading control signaling in the first way: identify the application layer offloading control signaling by using the UE-side address or the RNC-side IP address from which the application layer offloading control signaling is transmitted.

In an embodiment, the UE-side address may be the IP address obtained by the UE at the time of creating a PDP Context; and the RNC-side IP address may be a specific IP address configured by the system (the UE may obtain the IP address of the serving RNC through the DNS).

In this case, when the RNC receives an IP packet whose destination address is the specific IP address, the IP packet is regarded as carrying the application layer offloading control signaling from the UE; also, when the UE receives an IP packet whose source address is the specific IP address, the IP packet is regarded as carrying the application layer offloading control signaling from the RNC. The specific IP address is located in the IP address space of the external PDN. To avoid confusing the application layer offloading control signaling and the data packet of the UE, the specific IP address may be a reserved IP address. Taking IPv4 as an example, the specific IP address may be an address between 192.168.0.0 and 192.168.255.255.

The UE and the RNC may identify the application layer offloading control signaling in the second way: identify the application layer offloading control signaling by using the UE-side address or the RNC-side IP address from which the application layer offloading control signaling is transmitted, or through the TCP protocol that uses a specific TCP port to transmit the application layer offloading control signaling.

In an embodiment, the UE-side address may be the IP address obtained by the UE at the time of creating a PDP Context; and the RNC-side IP address may be a specific IP address configured by the system (the UE may obtain the IP address of the serving RNC through the DNS).

When the RNC receives an IP packet whose destination address is the specific IP address, and if the TCP port number is the specific TCP port number, this TCP-over-IP packet is regarded as carrying the application layer offloading control signaling from the UE; also, when the UE receives an IP packet whose source address is the specific IP address, and if the TCP port number is the specific TCP port number, the TCP-over-IP packet is regarded as carrying the application layer offloading control signaling from the RNC. The specific IP address is located in the IP address space of the external PDN. To avoid confusing the application layer offloading control signaling and the data packet of the UE, the specific IP address may be a reserved IP address. Taking IPv4 as an example, the specific IP address may be an address between 192.168.0.0 and 192.168.255.255, and the specific TCP port is a infrequently used TCP port (for example, 0-1024 are frequently used TCP port numbers).

I. The following describes the procedure for setting up convergent transmission of the UMTS and WLAN.

1. First, if the UE has uplink data for transmission but the PDP Context is inactive, the UE initiates a PDP Context activation procedure through a UMTS air interface, obtains the IP address of the corresponding PDN connection, and creates a UMTS bearer for the PDN connection. If the user enables the WLAN offloading function, the UE and the RNC may use the UMTS bearer to initiate an application layer offloading control signaling procedure between the UE and the RNC, thereby setting up convergent transmission of the UMTS and the WLAN.

2. The RNC may use the application layer offloading control signaling to notify the UE that an accessible WLAN AP exists at the current location, thereby starting the WLAN function module and getting ready to initiate WLAN offloading. The RNC may also use the application layer offloading control signaling to notify the UE that no accessible WLAN AP exists at the current location, and therefore, the WLAN function module is shut down to reduce power consumption of the UE.

The WLAN APs are generally distributed in hotspot areas and provide discontinuous coverage. Therefore, if the UE keeps starting the WLAN transceiving module, it may cause unnecessary power consumption. Further, the RNC can obtain the UE location information. For example, the RNC can know the cell in which the UE is located and know, through radio measurement on the UMTS air interface, whether the UE is located at the center of the cell or at the edges of several neighboring cells. Therefore, the RNC may use the application layer offloading control signaling to notify the UE that an accessible WLAN AP exists at the current location, thereby starting the WLAN function module and getting ready to initiate the WLAN offloading. The RNC may also use the application layer offloading control signaling to notify the UE that no accessible WLAN AP exists at the current location (for example, the UE leaves the hotspot area of the WLAN, or the WLAN restricts user access due to serious interference or overload), thereby shutting down the WLAN function module to reduce the power consumption of the UE.

3. After detecting an accessible WLAN AP, the UE may obtain the BSSID (basic service set identifier) of the WLAN AP. The BSSID serves to identify the WLAN AP uniquely.

4. By using the application layer offloading control signaling between the UE and the RNC, the UE sends to the RNC the BSSID of the WLAN AP with which the UE attempts to associate; further, the UE may send its MAC address to the RNC through the application layer offloading control signaling between the UE and the RNC.

Generally, the BSSID of a WLAN AP is the MAC address of the WLAN AP. The RNC stores a list of BSSIDs of all WLAN APs connected to the RNC. In this way, by using the application layer offloading control signaling between the UE and the RNC, the UE may send to the RNC the MAC address of the UE and the BSSID of the WLAN AP with which the UE attempts to associate.

5. The RNC matches the BSSID with a locally stored list of BSSIDs of connected WLAN APs; if the matching fails, the RNC instructs the UE not to initiate an association with the WLAN AP; if the matching succeeds, the RNC instructs the UE to initiate an association with the WLAN AP and initiate a WLAN authentication procedure.

In an embodiment, the WLAN authentication procedure may apply an SIM-based or USIM-based authentication way. The detailed procedure is defined in the IETF specifications such as RFC4186 and RFC4187.

In an embodiment, the WLAN authentication procedure may be an automatic authentication way based on the WLAN MAC address of the UE or based on the WLAN MAC address and the IP address. Specifically, the UE sends application layer offloading control signaling to the RNC, where the signaling carries the WLAN MAC address of the UE, and optionally, the IP address of the UE. The RNC sends the WLAN MAC address of the UE, and optionally, the IP address of the RNC to the associated WLAN AP whose BSSID is matched successfully. In addition, through the application layer offloading control signaling between the UE and the RNC, the UE negotiates with the RNC about the encryption algorithm of the WLAN air interface and the key of the encryption algorithm. The RNC sends the negotiated encryption algorithm and the key of the encryption algorithm of the WLAN air interface to the associated WLAN AP whose BSSID is matched successfully. In this way, the WLAN AP sets up a binding relationship between the WLAN MAC address of the UE and the key of the encryption algorithm, or a binding relationship between the WLAN MAC address and IP address of the UE and the key of the encryption algorithm. As a result, the WLAN AP regards the UE as legal and permits the access of the UE only if the UE fulfills the binding relationship.

6. After the UE is associated with the WLAN AP and authenticated successfully, the UE notifies the RNC, through application layer offloading control signaling between the UE and the RNC, or through a control plane interface between the WLAN AP and the RNC, that the UE (identified by a MAC address) has accessed the WLAN AP. Therefore, the RNC stores the mapping relationship between the UE and the BSSID of the accessed WLAN AP.

In an embodiment, when the UE is associated with another WLAN AP connected to the RNC due to the movement of the UE, the RNC updates the mapping relationship between the UE and the BSSID of the new WLAN AP accessed by the UE. By using this mapping relationship, the RNC can always send the downlink user data offloaded to the WLAN to the WLAN AP currently accessed by the UE, and then the WLAN AP sends the user data to the UE.

II. Meanwhile, through the application layer offloading control signaling between the UE and the RNC, the UE and the RNC make the following preparations for setting up convergent transmission of the UMTS and the WLAN:

(1) The UE sends its IMSI and MAC address to the RNC through the application layer offloading control signaling between the UE and the RNC, and the RNC creates the mapping relationship between the MAC address of the UE and every bearer channel (namely, a GTP-U tunnel) of the UE by using the IMSI and MAC address of the UE.

(2) Further, the UE negotiates and determines a data offloading policy of the UE through the application layer offloading control signaling between the UE and the RNC.

In an embodiment, the data offloading policy may be: how to separate the uplink and downlink data flows of the user, that is, the ways of setting the uplink UE-side packet filter and the downlink RNC-side packet filter; further, in an embodiment, the data offloading policy may include a percentage or priority level of the data traffic transmitted through the UMTS air interface against the data traffic transmitted through the WLAN air interface. For example, if the tariff policy of the operator specifies that the WLAN access is free of charge or the tariff of the WLAN traffic is lower than that of the UMTS traffic, the user prefers the WLAN as a means of transmitting data; when the battery is low, the user prefers the energy-efficient air interface as a means of transmitting data to prolong the battery life of the terminal. The system generally makes optimized selection according to the radio resource state (such as interference and congestion) of the air interfaces of the UMTS and the WLAN. For example, when the WLAN interference is great, which leads to a sharp decrease of the transmission rate, the system tends to offload the traffic to the UMTS air interface.

(3) The uplink and downlink data of the UE is transmitted through the UMTS air interface, and the UE may resolve the user IP packet on each downlink UMTS bearer of the UE to obtain the destination address (namely, the IP address of the corresponding PDN connection of the UE), and create a mapping relationship between the IP address of every PDN connection of the UE and the corresponding application layer; the RNC resolves the user IP packet on each uplink UMTS bearer of the UE to obtain the source address (namely, the IP address of the corresponding PDN connection of the UE), and creates a mapping relationship between the IP address of every PDN connection of the UE and the corresponding GTP-U tunnel.

(4) Through the control plane interface between the RNC and the WLAN AP, the RNC and the WLAN AP accessed by the UE negotiate a UDP port number used by the user plane interface between the RNC and the WLAN AP to transmit the uplink data and/or downlink data of the UE. The WLAN AP and the RNC may create a mapping relationship between the MAC address of the UE and the UDP port number of the user plane interface that is between the RNC and the WLAN AP.

After the foregoing operations are finished, convergent transmission of the UMTS and the WLAN may begin.

As described above, in the uplink direction, the UE uses an external packet filter of a UMTS transceiving module (generally an independent ASIC chip) to separate the uplink data flows of each PDN connection from the application layer into different uplink IP flows.

Then, according to the data offloading policy negotiated with the RNC, the UE sends a part or all of the uplink IP flows to a WLAN AP through a WLAN air interface.

The WLAN AP sends all the uplink data packets from the UE having this MAC address to the RNC through the corresponding UDP port.

The RNC uses the UDP port number to find the corresponding bearer channel (namely, a GTP-U tunnel) of the UE according to the mapping relationship between the MAC address of the UE and the UDP port number of the user plane interface that is between the RNC and the WLAN AP; and, according to different source IP addresses (corresponding to different PDN connections), the RNC separates all the UE's uplink data packets transmitted through the WLAN into at least one data flow, and forwards the at least one data flow to the corresponding GTP-U tunnel respectively according to the mapping relationship created between the IP address of every PDN connection of the UE and the corresponding GTP-U tunnel. Meanwhile, the UE sends the remaining part of the uplink IP flows to the RNC through the corresponding uplink UMTS radio bearers according to existing UMTS standards, and then the RNC forwards the IP flows to the corresponding uplink GTP-U tunnels respectively. In this way, convergent transmission of the uplink user data is implemented at the air interfaces of the UMTS and the WLAN.

In the downlink direction, the RNC separates the downlink data flows of each PDN connection of the UE into different downlink IP flows through a built-in packet filter.

Then, according to the data offloading policy negotiated with the UE, the RNC sends a part or all of the downlink IP flows to a WLAN AP through the corresponding UDP port.

By using the UDP port number, the WLAN AP sends all the UE's downlink data packets from the UDP port to the UE having the MAC address through the WLAN air interface according to the mapping relationship between the MAC address of the UE and the UDP port number of the user plane interface that is between the RNC and the WLAN AP.

According to the destination IP address (corresponding to different PDN connections), the UE separates all the uplink data packets from the WLAN air interface into at least one data flow, and forwards the at least one data flow to the corresponding application layer respectively according to the mapping relationship created between the IP address of every PDN connection of the UE and the corresponding application layer. Meanwhile, according to the existing UMTS standards, the RNC sends the remaining part of the downlink IP flows to the UE through the corresponding downlink UMTS radio bearers. In this way, convergent transmission of the downlink user data is implemented at the air interfaces of the UMTS and the WLAN.

In addition, when the UE is to leave the current serving RNC due to the movement of the UE, the RNC receives an RNC relocation (RNC Relocation) request from the UE. Before deciding to start RNC relocation, the RNC reconfigures the offloading, that is, reconfigures the user data flows previously offloaded to the WLAN as being transmitted by the UMTS; and, through the application layer offloading control signaling between the UE and the RNC, the RNC instructs the UE to cancel the association with the currently accessed WLAN AP, or, through the control plane interface between the RNC and the WLAN AP, the RNC instructs the WLAN AP currently accessed by the UE to cancel the association with the UE. After the association is cancelled successfully, the RNC starts an RNC relocation procedure. After the RNC relocation is completed and the UE hands over to a new RNC, if a WLAN AP is currently accessible, the UE repeats the foregoing procedure to access the WLAN AP connected to the current serving RNC, thereby setting up convergent transmission of the UMTS and the WLAN again.

It should be noted that, in addition to the offloading control between the UE and the RNC based on application layer signaling carried on the user plane as described above, offloading control may be implemented by directly extending the RRC (radio resource control) protocol between the UE and the S-GW in the existing standards to add functions of the application layer offloading control signaling between the UE and the S-GW according to the present invention. That is, the RRC signaling is used to transmit the information related to offloading control between the UE and the RNC in an embodiment of the present invention. In this case, the RRC signaling that transmits the information related to offloading control between the UE and the RNC is known as RRC offloading control signaling.

According to the description above, compared with solution 1 that uses the TFT of the UMTS, solution 2 may schedule the IP flows between the UMTS and the WLAN dynamically, and exercise control flexibly. Meanwhile, solution 2 avoids the trouble that the UE needs to obtain the access stratum bearer identifier such as an RAB ID or RB ID and the trouble that the transceiving module of the UMTS is required to output the IP flows that are output by the UL-TFT and offloaded to the WLAN (such troubles require modifications to the UMTS Modem ASIC), and solution 2 is easier to implement.

According to the foregoing technical solution of the embodiment of the present invention, the data offloading and converging node replaces the UMTS radio bearers partially or completely with the WLAN radio bearer, in which the data offloading and converging node is fully transparent to the core network; and the WLAN access is implemented without the need of modifying the cellular network, which reduces the period and cost of network construction. The WLAN radio bearer may serve as a technology of enhancing radio air interfaces to improve data transmission rates greatly, enhance the user experience, and improve quality of service of the mobile communication network.

In an embodiment, the convergent transmission system shown in FIG. 5 is also applicable to an HNB (home Node B) system. In this case, the data offloading and converging node 110 is an HNB GW (Home Node B Gateway, home Node B gateway). The convergent transmission system is also applicable to an HNB system, and the functions of the nodes in the system are similar to the functions illustrated in FIG. 6 and FIG. 7. In the HNB system, the data offloading method and the convergent transmission procedure of data are similar to those in solution 1 and solution 2. However, in this case, the data offloading and converging node 110 is an HNB GW, and the cellular node is an HNB. The offloading procedure and the convergent transmission procedure of data are not detailed here. The following briefly describes only the functions of some devices and the user data transmission.

Figure 15:
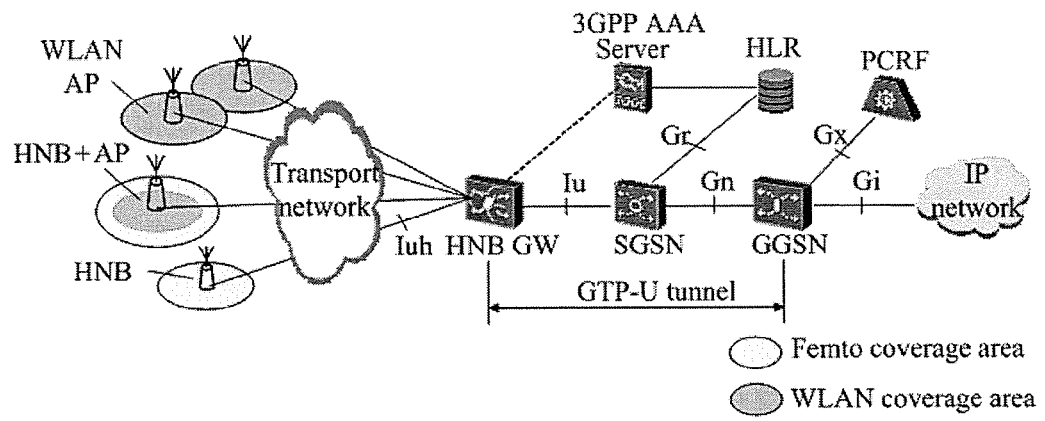
FIG. 15 is an application architecture diagram of a convergent transmission system applied in an HNB system according to an embodiment of the present invention.

FIG. 15 is an application architecture diagram of a convergent transmission system applied in an HNB system. In FIG. 15, the UMTS HNB is closely coupled with the WLAN. The HNB GW and the HNB shown in FIG. 15 are network elements in a UMTS home Node B access network defined in the 3GPP protocol system.

The HNB is connected to the HNB GW through an Iuh interface, and the HNB GW is connected to the SGSN through an Iu interface. The Iu interface is divided into a control plane and a user plane, and transmission is implemented on the two planes through different transport protocols respectively. The transport layer protocol of the control plane RUA (RANAP (Radio Access Network Application Part) User Adaptation) is SCTP (Stream Control Transmission Protocol), and the transport layer protocol of the user plane is GTP-U over UDP. That is, the user data is carried in the GTP-U tunnel. The GTP-U tunnel is uniquely identified by a combination of the TEID of the GTP-U header, UDP port number of the UDP/IP layer, and the IP address. For ease of description, the combination of the TEID of the GTP-U header, UDP port number of the UDP/IP layer, and the IP address, which serves as an identifier of the GTP-U tunnel, is hereinafter referred to as "GTP-U tunnel identifier".

Figure 16:
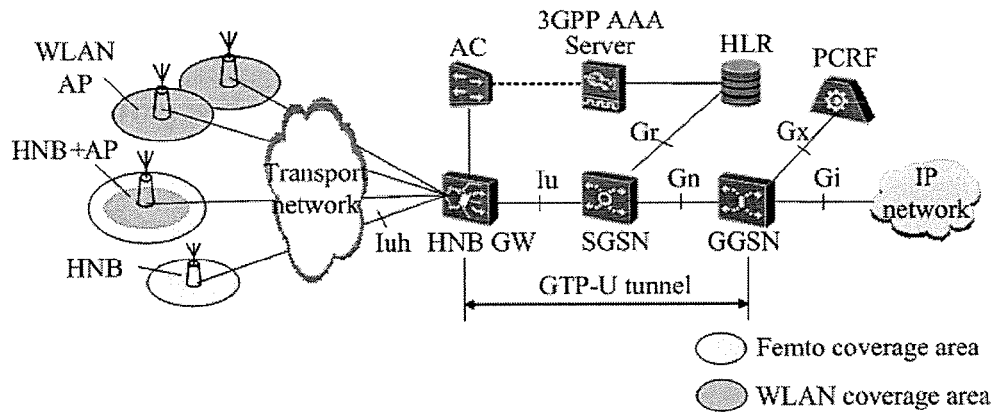
FIG. 16 is an application architecture diagram of a convergent transmission system applied in an HNB system according to an embodiment of the present invention.

FIG. 16 shows an application architecture diagram of another convergent transmission system applied in an HNB system, which is different from the architecture shown in FIG. 15 in: in this embodiment, the control and management functions of the AC in the existing WLAN network, including the WLAN-related management and control functions such as authenticating the WLAN AP connected to the HNB GW, performing network management, and coordinating and managing the interference between WLAN APs, are not integrated in the HNB GW. Instead, the AC is an independent device connected to the HNB GW and the AAA server. An IP interface may be applied between the AC and the RNC, and the HNB GW serves only to forward the WLAN-related management and control IP packets, which are carried between the AC and the WLAN AP.

In the architecture shown in FIG. 15, a logical interface exists between the HNB GW and the WLAN AP. The logical interface is divided into a control plane and a user plane. The control plane serves to transmit WLAN management and control information and mobility management information; and the user plane serves to transmit the user data flows that are offloaded to the WLAN AP and transmitted through the WLAN. The user plane implements transmission through the way of UDP over IP, and the control plane implements transmission through the way of TCP over IP or SCTP over IP.

In the architecture shown in FIG. 16, a logical interface also exists between the AC and the WLAN AP, with the transmission way of TCP over IP or SCTP over IP. The logical interface serves to transmit WLAN-related management and control information, and the control plane of the interface between the HNB GW and the WLAN AP serves to transmit mobility management information.

Figure 17:
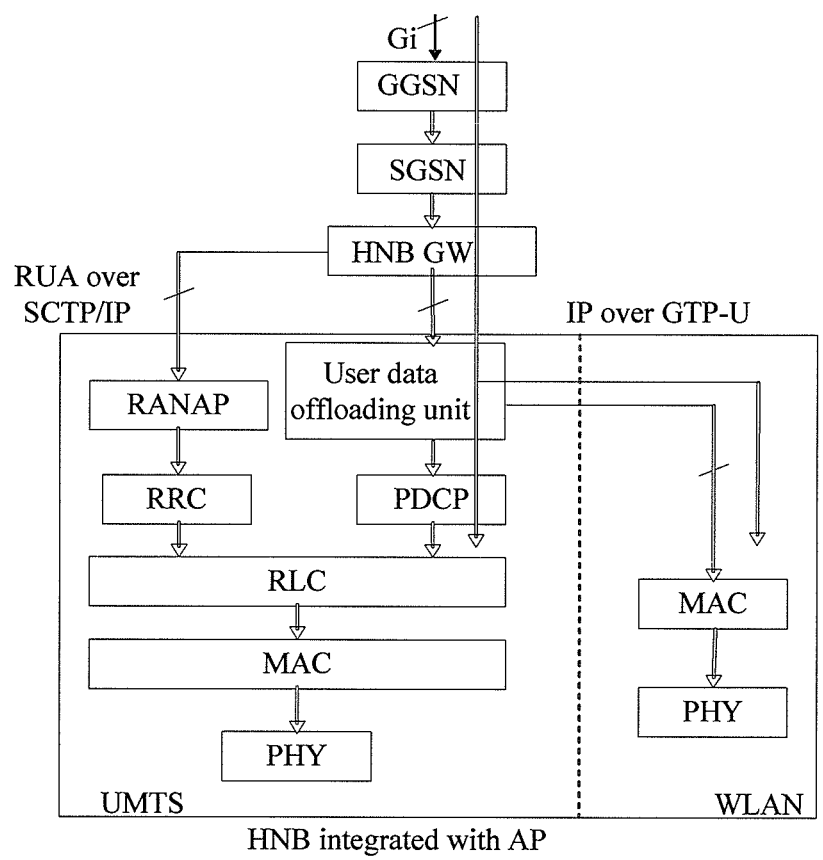
FIG. 17 is a schematic diagram of data transmission according to an embodiment of the present invention.

The user data offloading function of convergent transmission of the UMTS and the WLAN may be implemented in an HNB (only when the HNB is integrated with the WLAN AP), or implemented in an HNB GW. FIG. 17 is a schematic diagram of user data transmission when the user data offloading function is implemented in an HNB. In the downlink direction, for example, the user data passes through a Gi interface to arrive at the GGSN, passes through the GTP-U tunnel of the Gn interface and the SGSN to arrive at the HNB GW, and then passes through the GTP-U tunnel of an Iu interface to arrive at the HNB (the HNB is integrated with the WLAN AP). The user data arriving at the HNB is separated by a user data offloading unit into two parts to be transmitted through the air interface of the UMTS and the air interface of the WLAN respectively.

Figure 18:
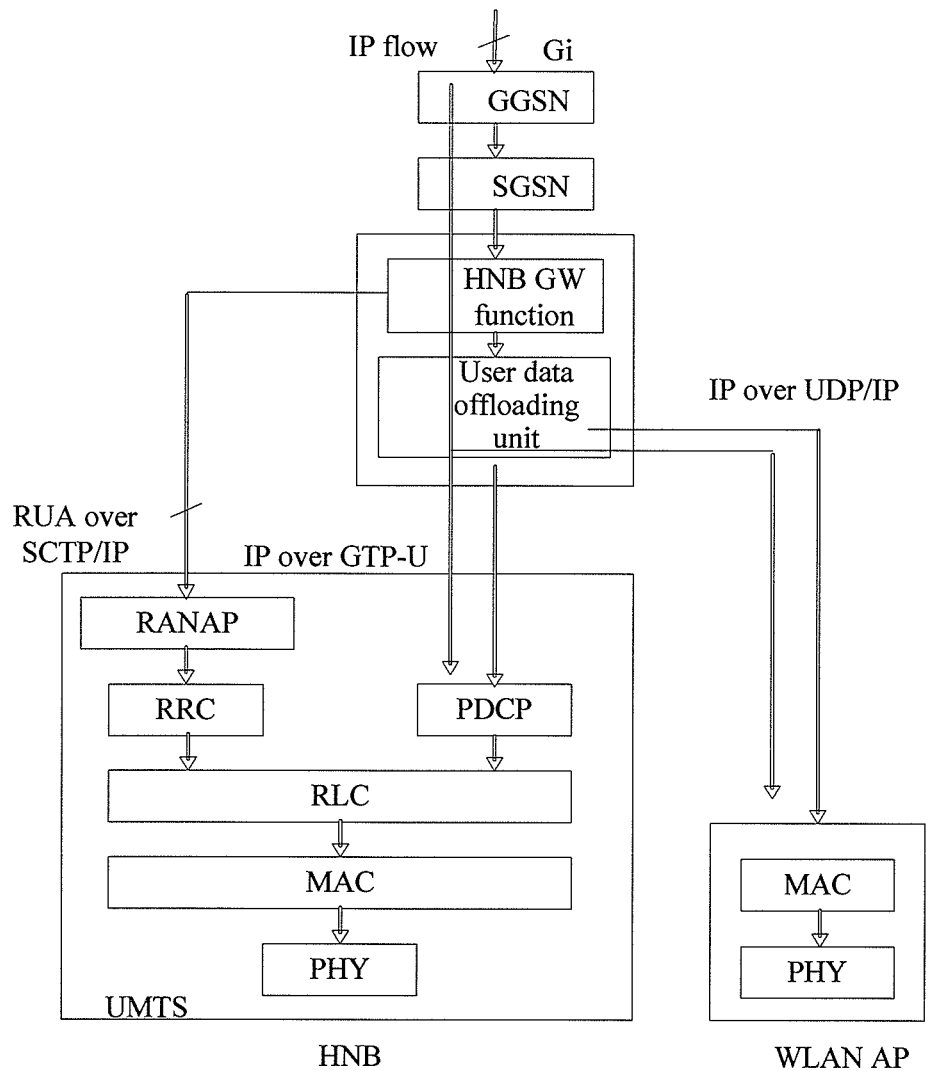
FIG. 18 is a schematic diagram of data transmission according to an embodiment of the present invention.

FIG. 18 is a schematic diagram of user data transmission when the user data offloading function is implemented in an HNB GW, which is applicable when the HNB is integrated with the WLAN AP, and applicable when the HNB is independent of the WLAN AP. After being processed by the HNB GW, the user data is separated by the user data offloading unit into two parts: the user data transmitted through the UMTS is sent to the HNB through the user plane transmission channel of the Iuh interface, namely, GTP-U/UDP/IP; and the user data transmitted through the WLAN is sent through UDP/IP to the WLAN AP. In this way, the user data is transmitted through the air interface of the UMTS and the air interface of the WLAN respectively. The procedure in the uplink direction is contrary to that in the downlink direction, and is not described here.

Further, to enable the UE to simultaneously perform convergent transmission with the macro Node B and the home Node B such as a WLAN AP (for example, the WLAN AP is integrated with the HNB) shown in FIG. 15 and FIG. 16, if an IP link exists between the WLAN AP and the SGSN connected to the macro Node B Node B, the user data offloading function may be implemented in the SGSN. In this way, after being separated by the SGSN into two parts, the user data may be transmitted through the macro Node B and the WLAN AP respectively.

Figure 19:
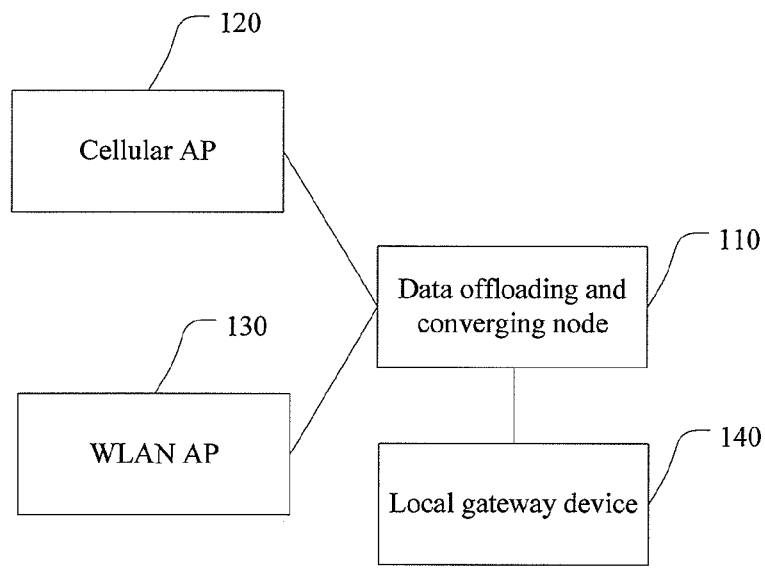
FIG. 19 is a structural diagram of a convergent transmission system according to an embodiment of the present invention.

As shown in FIG. 19, an embodiment of the present invention provides another convergent transmission system. Compared with the system architecture provided in FIG. 5, the system in the embodiment of the present invention further includes:

a local gateway device 140, configured to offload the data transmitted through the WLAN from a data offloading and converging node to an external IP network.

The solution provided in this embodiment enables a WLAN-only terminal, which is capable of accessing only the WLAN, to access the aforementioned convergent network of the UMTS and the WLAN. Examples of the WLAN-only terminal include: tablet and notebook computers capable of accessing only the WLAN, and terminals that are not permitted to access the cellular system because the users are not users of the current network operator although they are capable of accessing the cellular system and the WLAN.

First, the WLAN-only terminals lack the capability of accessing the cellular network. Therefore, unlike the dual-mode terminals capable of accessing both the cellular system and the WLAN, the WLAN-only terminals do not need to switch between the cellular system and the WLAN. Moreover, the WLAN is generally applied in hotspot areas and provides discontinuous coverage, and is not able to support mobility across different hotspot areas. Therefore, the WLAN-only terminals can meet requirements only if the terminals switch between WLAN APs in a specific hotspot area.

Figure 20:
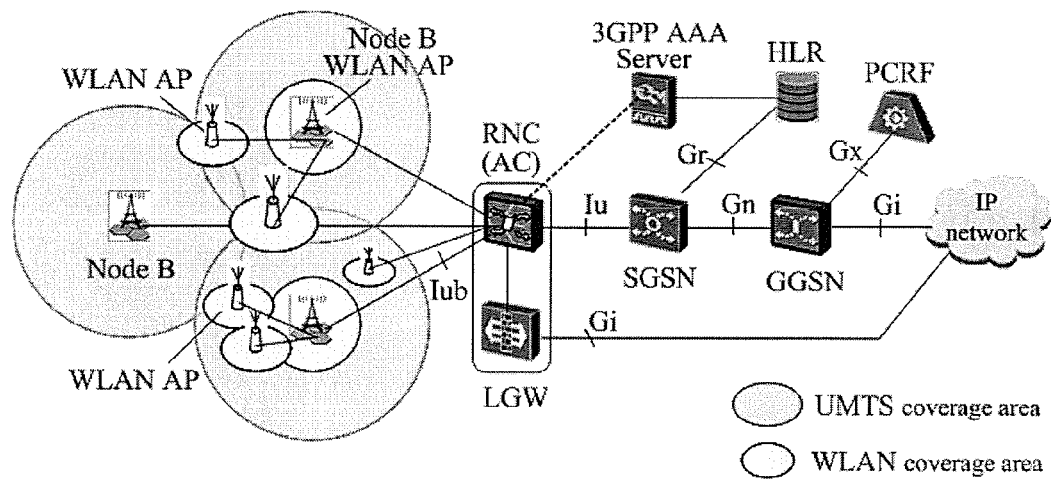
FIG. 20 is a detailed application architecture diagram of a convergent transmission system according to an embodiment of the present invention.
Figure 21:
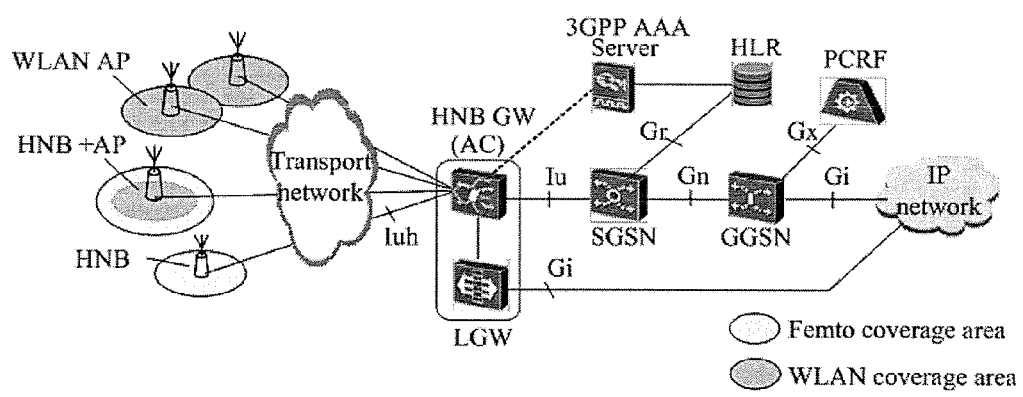
FIG. 21 is a detailed application architecture diagram of a convergent transmission system according to an embodiment of the present invention.

FIG. 20 and FIG. 21 show two detailed application architectures of the convergent transmission system shown in FIG. 19. In the network architectures shown in FIG. 20 and FIG. 21, a data offloading and converging node (such as an RNC and HNB GW) may be connected to the WLAN APs in multiple hotspot areas (the multiple hotspot areas may provide continuous or discontinuous coverage). The WLAN between different data offloading and converging nodes provides no continuous WLAN coverage, and is a relatively independent WLAN service area.

Based on the analysis above, the WLAN that crosses data offloading and converging nodes (such as RNCs and HNB GWs) requires no mobility. Therefore, for WLAN-only terminals, the data does not need to pass through the UMTS core network, and may be offloaded by a data offloading and converging node to an external IP network. As shown in FIG. 20 and FIG. 21, the data offloading and converging node (such as an RNC and HNB GW) is connected to an LGW (Local Gateway, local gateway). An IP interface exists between the LGW and the data offloading and converging node, the control plane may implement transmission through the way of TCP over IP or SCTP over IP, and the user plane may implement transmission through the way of UDP over IP. In an embodiment, the LGW may be integrated with the data offloading and converging node, and the data offloading and converging node is connected to the external IP network directly.

In an embodiment, the LGW may be a small-capacity simplified GGSN. The interface between the LGW and the RNC may use the GTP protocol (GPRS Tunneling Protocol) of the cellular system in the packet switched domain as a transport protocol. That is, the control plane uses GTP-C, and the user plane uses GTP-U. Both GTP-C and GTP-U are carried over UDP/IP. Alternatively, an interface may be configured between the data offloading and converging node and the GGSN. In this way, the data offloading and converging node may transmit the data of the WLAN-only terminal to the GGSN through this interface directly.

The main functions of the LGW are to transmit the user data from a data offloading and converging node to an external network through UDP over IP, and include but are not limited to general functions of a packet data gateway: functions of a DHCP (Dynamic Host Configuration Protocol) server that allocates IP addresses to the terminals automatically, firewall function or network address translation function, deep packet inspection (Deep Packet Inspection, DPI) function, data flow policing (Policing) function, and packet routing function (sending the user IP packets to the corresponding PDN.

Unlike a dual-mode terminal whose authentication is generally based on a SIM/USIM, a WLAN-only terminal generally lacks a cellular device, and therefore, the user authentication is still based on the user name and password, that is, the user is authenticated by automatically or manually inputting the user name and password that are allocated by the system.

In this way, when continuous coverage exists between WLAN APs under the same data offloading and converging node, the WLAN-only terminal may switch between APs through the existing WLAN protocol. As shown in FIG. 20, after finding that a WLAN AP is accessible, a WLAN-only terminal associates with the AP. The AP performs WLAN authentication according to the user name and password that are allocated by the system. The authentication request message is sent to the RNC through a control plane interface between the WLAN AP and the RNC, and the RNC queries an AAA server to determine whether the user is legal. After the authentication succeeds, the system uses the DHCP function in the LGW to allocate an IP address to the terminal, and therefore, the terminal may transmit data through the WLAN AP.

Meanwhile, the RNC records the MAC address and IP address of the terminal, and the BSSID of a currently associated WLAN AP. The BSSID is generally configured as a MAC address of the WLAN AP. The RNC also stores a list of BSSIDs of all connected WLAN APs. In this way, the RNC stores the mapping relationship between the MAC/IP address of the terminal and the BSSID of the associated WLAN AP. When the UE is associated with another WLAN AP connected to the RNC due to the movement of the UE, the RNC updates the mapping relationship between the MAC/IP address of the terminal and the BSSID of the associated WLAN AP. According to this mapping relationship, the RNC can send the downlink data of the terminal to the associated WLAN AP.

The packet core network in the packet domain (such as GPRS and EDGE) of the GSM employs a GPRS core network architecture similar to that of the UMTS, and the architecture of the radio access network is also similar to that of the UMTS, that is, includes a BTS (base transceiver station) and a BSC (base station controller). Therefore, the system architecture and solution that are proposed in the embodiment of the present invention are also applicable to convergent transmission of the GPRS/EDGE and WLAN except that the protocol details are different. For convergent transmission of any other 3G system (such as CDMA2000 and EVDO) and the WLAN, the basic principles proposed in the embodiment of the present invention are also applicable.

That is, the convergent transmission system shown in FIG. 5 may be applied in multiple different architectures. For example, it may be applied in a UMTS system, a UMTS HNB system, a GPRS system, an EDGE system, a CDMA2000 system, or an EVDO system. The data offloading and converging node 110 varies in different cellular networks. For example, the node is an RNC in a UMTS system, or an HNB GW in a UMTS HNB system, or a BSC in a GPRS system, or a BSC in an EDGE system, or a BSC in a CDMA2000 system, or a BSC in an EVDO system.

Figure 22:
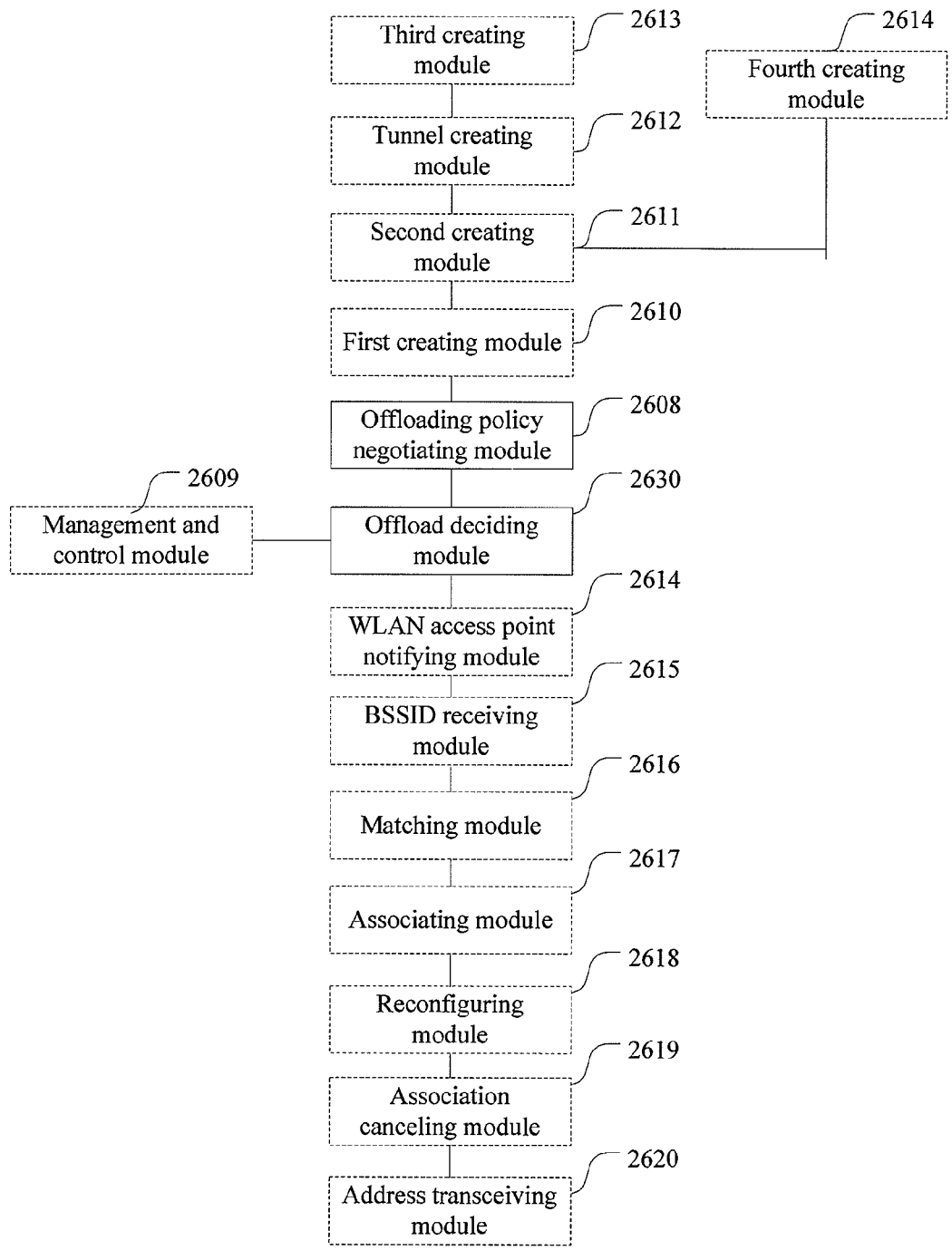
FIG. 22 is a structural diagram of a data offloading and converging node according to an embodiment of the present invention.

As shown in FIG. 22, in summary, an embodiment of the present invention provides a data offloading and converging node according to the embodiments of various system architectures above and functions of each device in the system architectures. The data offloading and converging node includes: an offloading policy negotiating module 2608 and an offload deciding module 2630.

The offloading policy negotiating module 2608 is configured to negotiate with a user equipment (UE) to determine a data offloading policy.

Specifically, the offloading policy negotiating module 2608 may negotiate with the UE to determine a data offloading policy through offloading control signaling, where the offloading control signaling is carried in an application layer message transferred between the data offloading and converging node and the UE, or, the offloading control signaling is carried in an RRC message transferred between the data offloading and converging node and the UE.

The offload deciding module 2630 is configured to: according to the data offloading policy determined by negotiating with the UE, use a WLAN radio bearer to transmit a part of user data, where the WLAN radio bearer is a result of configuring a part of radio bearers of a cellular system as WLAN radio links; and use a remaining radio bearer of the cellular system to transmit a remaining part of the user data, where the radio bearers are a radio part of bearer channels of the cellular system, and the bearer channels of the cellular system are created through control plane signaling of the cellular system.

That is, the WLAN radio bearer is used to transmit a part of the user data, and the channels of the cellular system are used to transmit the remaining part of the user data.

In an embodiment, the offload deciding module 2640 may include:

a downlink data offloading unit, configured to offload downlink user data of the UE into a first part to be transmitted through the cellular access point and a second part to be transmitted through the WLAN access point; and a downlink transmitting unit, configured to transmit the first part of the data to the cellular access point and transmit the second part of the data to the WLAN access point respectively.

In an embodiment, the offload deciding module 2612 may further include:

an uplink receiving unit, configured to receive the first part of uplink user data of the UE from the cellular access point and receive the second part of uplink user data from the WLAN access point;

an uplink converging unit, configured to converge the first part of uplink user data and the second part of uplink user data into uplink user data; and an uplink transmitting unit, configured to send the uplink user data to a cellular network.

Optionally, as indicated by the dashed boxes in FIG. 22, the data offloading and converging node may further include: a management and control module 2609, a first creating module 2610, a second creating module 2611, a tunnel creating module 2612, a third creating module 2613, a fourth creating module 2614, a WLAN access point notifying module 2614, a BSSID receiving module 2615, a matching module 2616, an associating module 2617, a reconfiguring module 2618, an association cancelling module 2619, and an address transceiving module 2620.

The management and control module 2609 is configured to create a logical interface with the WLAN access point, and send management and control information through the control plane of the logical interface to manage and control the WLAN access point.

In an embodiment, the WLAN access point is configured to receive the part of user data transmitted by the data offloading and converging node through a WLAN radio bearer, and send the part of user data through an air interface.

The first creating module 2610 is configured to create a first mapping relationship, where the first mapping relationship is a mapping relationship between the MAC address of the UE and the UDP port number of the user plane interface that is between the data offloading and converging node and the WLAN AP.

The second creating module 2611 is configured to create a second mapping relationship, where the second mapping relationship is a mapping relationship between the MAC address of the UE and every bearer channel of the UE.

In an embodiment, the second creating module 2611 may include:

a receiving unit, configured to receive the UE's international mobile subscriber identity (IMSI) and MAC address that are sent by the UE through the offloading control signaling; and a mapping relationship creating unit, configured to create a mapping relationship between the MAC address of the UE and every bearer channel of the UE according to the stored mapping relationship between the IMSI of the UE and every bearer channel of the UE.

The tunnel creating module 2612 is configured to create at least one end-to-end tunnel between the data offloading and converging node and the UE if the user data is transmitted over a WLAN radio bearer, where each end-to-end tunnel transmits one of the UE's data flows transmitted over the WLAN radio bearer.

The third creating module 2613 is configured to create a third mapping relationship, where the third mapping relationship is a mapping relationship between the end-to-end tunnel and the bearer channel of the UE.

The fourth creating module 2614 is configured to resolve the user data transmitted through the air interface of the cellular system to obtain the IP address of the corresponding PDN connection of the UE; and create a fourth mapping relationship, where the fourth mapping relationship is a mapping relationship between the IP address of every PDN connection of the UE and the bearer channel of the UE, and each PDN connection of the UE corresponds to a bearer channel.

The WLAN access point notifying module 2614 is configured to: use the application layer offloading control signaling to notify the UE that an accessible WLAN access point exists at the current location, so that the UE enables the WLAN to offload data; or, use the application layer offloading control signaling to notify the UE that no accessible WLAN access point exists at the current location, so that the UE stops WLAN data offloading.

The BSSID receiving module 2615 is configured to: through the application layer offloading control signaling, receive a basic service set identifier (BSSID) of the WLAN access point with which the UE attempts to associate.

The matching module 2616 is configured to match the BSSID with a locally stored list of BSSIDs of connected WLAN access points.

The associating module 2617 is configured to: if the matching succeeds, allow the UE to set up an association between the UE and the WLAN access point with which the UE attempts to associate.

The reconfiguring module 2618 is configured to, when the UE leaves, reconfigure the part of user data, which is previously offloaded by the WLAN channel for transmission, as being transmitted by the channel of the cellular system.

The association cancelling module 2619 is configured to send the application layer offloading control signaling to the UE to instruct the UE to cancel the association with the currently associated WLAN access point.

The address transceiving module 2620 is configured to receive a MAC address of the UE through the application layer offloading control signaling, and send the MAC address to the WLAN access point so that the WLAN access point authenticates the UE according to the MAC address.

Optionally, the offloading and converging node is further configured to:

send the UE's MAC address to the WLAN access point, or receive the IP address from the UE through the offloading control signaling, and send the MAC address and IP address of the UE to the WLAN access point; and negotiate with the UE about the encryption algorithm of the WLAN air interface and the key of the encryption algorithm through the offloading control signaling, and send the encryption algorithm and the key of the encryption algorithm to the WLAN access point, so that the WLAN access point sets up a binding relationship between the MAC address and the key of the encryption algorithm or sets up a binding relationship between the MAC address and IP address and the key of the encryption algorithm and regards the UE fulfilling the binding relationship as an authenticated legal terminal.

According to the foregoing technical solution of the embodiment of the present invention, the data offloading and converging node replaces the UMTS radio bearers partially or completely with the WLAN radio bearer, in which the data offloading and converging node is fully transparent to the core network; and the WLAN access is implemented without the need of modifying the cellular network, which reduces the period and cost of network construction. The WLAN radio bearer may serve as a technology of enhancing radio air interfaces to improve data transmission rates greatly, enhance the user experience, and improve quality of service of the mobile communication network.

Figure 23:
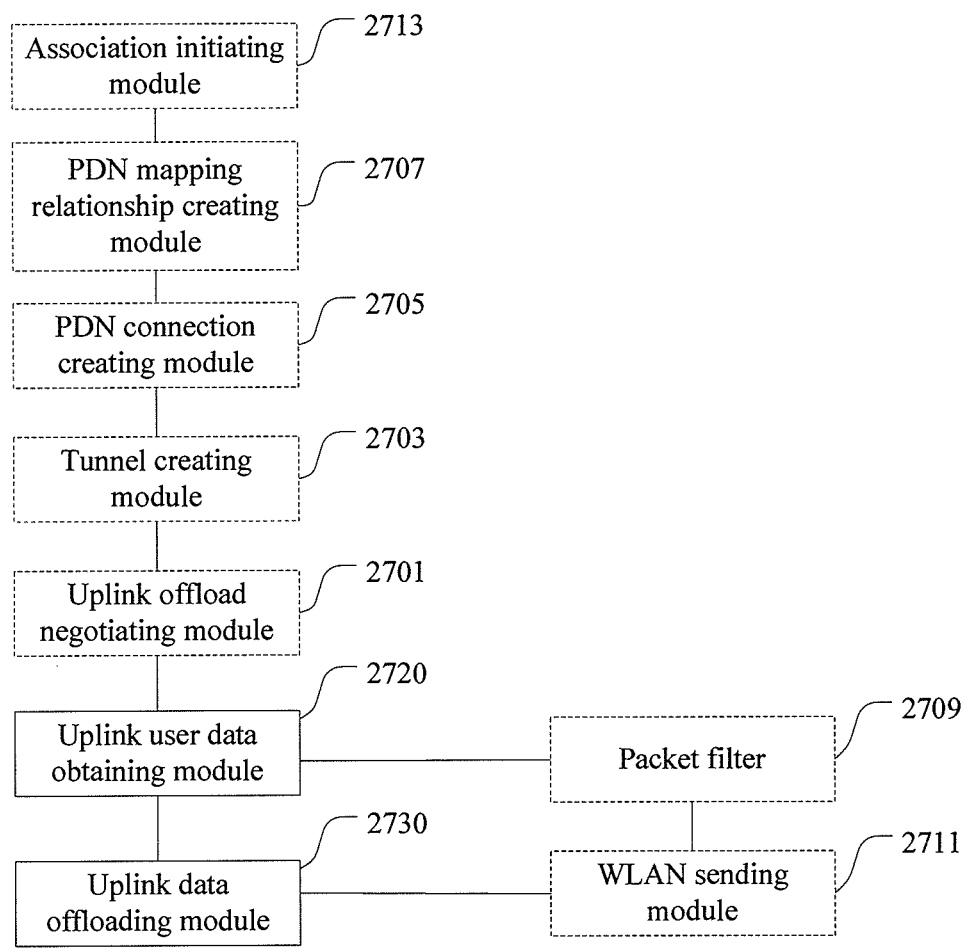
FIG. 23 is a structural diagram of a UE according to an embodiment of the present invention.

As shown in FIG. 23, in summary, an embodiment of the present invention provides a UE according to the embodiments of various system architectures above and functions of each device in the system architectures. The UE includes:

an uplink user data obtaining module 2720, configured to obtain uplink user data; and an uplink data offloading module 2730, configured to: according to a data offloading policy determined by negotiating with a data offloading and converging node, use a WLAN radio bearer to transmit a part of the uplink user data to the data offloading and converging node, and use channels of a cellular system to transmit a remaining part of the uplink user data to the data offloading and converging node, whereupon the data offloading and converging node converges the part of the uplink user data and the remaining part of the uplink user data into uplink user data.

Optionally, in an embodiment, as indicated by the dashed boxes in FIG. 23, the UE may further include:

an uplink offload negotiating module 2701, configured to negotiate with the data offloading and converging node to determine a data offloading policy through offloading control signaling, where the offloading control signaling is carried in an application layer message transferred between the data offloading and converging node and the UE, or the offloading control signaling is carried in an RRC message transferred between the data offloading and converging node and the UE;

a tunnel creating module 2703, configured to create at least one end-to-end tunnel at the data offloading and converging node if the user data is transmitted over a WLAN radio bearer, where each end-to-end tunnel transmits one of the UE's data flows transmitted over the WLAN radio bearer;

a PDN connection creating module 2705, configured to create a PDN connection to one or more packet data networks (PDNs) through the control plane of the air interface of the cellular system, where each PDN connection corresponds to a bearer channel, and an IP address is allocated to each PDN connection;

a PDN mapping relationship creating module 2707, configured to set up a mapping relationship between the IP address of every PDN connection of the UE and the application layer;

a packet filter 2709 located outside a transceiving module of the cellular system, configured to separate the uplink user data of each PDN connection from the application layer into uplink data flows;

a WLAN sending module 2710, configured to send a part or all of user data flows through a WLAN air interface according to the data offloading policy, where the part or all of user data flows carry the IP address corresponding to the application layer; and an association initiating module 2712, configured to: through the application layer offloading control signaling, send to the data offloading and converging node a BSSID of the WLAN AP with which the UE attempts to associate, so that the data offloading and converging node matches the BSSID with a locally stored list of BSSIDs of connected WLAN access points, and, if the matching succeeds, allows the UE to set up an association between the UE and the WLAN access point with which the UE attempts to associate.

According to the foregoing technical solution of the embodiment of the present invention, the data offloading and converging node replaces the UMTS radio bearers partially or completely with the WLAN radio bearer, in which the data offloading and converging node is fully transparent to the core network; and the WLAN access is implemented without the need of modifying the cellular network, which reduces the period and cost of network construction. The WLAN radio bearer may serve as a technology of enhancing radio air interfaces to improve data transmission rates greatly, enhance the user experience, and improve quality of service of the mobile communication network.

Persons skilled in the art understand that a part or all of the steps of the method provided in the embodiments above may be implemented by a computer program instructing relevant hardware. The program may be stored in a computer readable storage medium. When the program runs, the program executes the steps of the method specified in any embodiment above. The storage medium may be a magnetic disk, CD- ROM, read-only memory (Read-Only Memory, ROM), or random access memory (Random Access Memory, RAM).

The above descriptions are merely exemplary embodiments of the present invention. Any modifications and variations that may be easily derived by those skilled in the art according to the disclosure of the application document do not depart from the idea of the present invention and shall fall within the protection scope of the present invention.

What is claimed is:

1. A convergent transmission system, comprising a data offloading and converging node, a cellular access point, and a wireless local area network (WLAN) access point, wherein:
   the data offloading and converging node is configured to:
   negotiate with a user equipment (UE) to determine a data offloading policy; according to the data offloading policy determined by negotiating with the UE,
   use a WLAN radio bearer to transmit a part of user data, wherein the WLAN radio bearer is a result of configuring a part of radio bearers of a cellular system as WLAN radio links, and
   use a remaining radio bearer of the cellular system to transmit a remaining part of the user data, wherein the radio bearers are a radio part of bearer channels of the cellular system, and the bearer channels of the cellular system are created through control plane signaling of the cellular system;
   the WLAN access point is configured to work with the UE and the data offloading and converging node to transmit the part of the user data; and
   the cellular access point is configured to work with the UE and the data offloading and converging node to transmit the remaining part of the user data.

2. The convergent transmission system according to claim 1, wherein:
   the data offloading and converging node is configured to negotiate with the UE to determine a data offloading policy through offloading control signaling; and
   the offloading control signaling is carried in an application layer message transferred between the data offloading and converging node and the UE; or, the offloading control signaling is carried in a radio resource control (RRC) message transferred between the data offloading and converging node and the UE.

3. The convergent transmission system according to claim 1, wherein the data offloading and converging node is configured to:
   in a downlink direction, offload downlink user data of the UE to separate a first part of data to be transmitted through the cellular access point from a second part of data to be transmitted through the WLAN access point, and transmit the first part of data and the second part of data to the cellular access point and the WLAN access point respectively; and
   in an uplink direction, receive a first part of uplink user data and a second part of uplink user data of the UE from the cellular access point and the WLAN access point respectively, converge the first part of uplink user data and the second part of uplink user data into uplink user data, and send the uplink user data to a cellular network.

4. The convergent transmission system according to claim 2, wherein:
   the data offloading and converging node is further configured to:
   create a first mapping relationship, wherein the first mapping relationship is a mapping relationship between a media access control (MAC) address of the UE and a UDP port number of a user plane interface that is between the data offloading and converging node and the WLAN AP (access point).

5. The convergent transmission system according to claim 2, wherein the data offloading and converging node is further configured to:
   create a second mapping relationship, wherein the second mapping relationship is a mapping relationship between the MAC address of the UE and every bearer channel of the UE.

6. The convergent transmission system according to claim 5, wherein the data offloading and converging node is configured to:
   receive the UE's international mobile subscriber identity (IMSI) and MAC address that are sent by the UE through the offloading control signaling; and
   create a mapping relationship between the MAC address of the UE and every bearer channel of the UE according to a locally stored mapping relationship between the IMSI of the UE and every bearer channel of the UE.

7. The convergent transmission system according to claim 2, wherein the data offloading and converging node is further configured to:
   create at least one end-to-end tunnel between the data offloading and converging node and the UE if user data is transmitted over a WLAN radio bearer, wherein each end-to-end tunnel transmits one of the UE's data flows transmitted over the WLAN radio bearer.

8. The convergent transmission system according to claim 7, wherein the data offloading and converging node is further configured to:
   create a third mapping relationship, wherein the third mapping relationship is a mapping relationship between the end-to-end tunnel and a bearer channel of the UE.

9. The convergent transmission system according to claim 8, wherein:
   a tunnel number of the end-to-end tunnel is a UDP port number in an outer UDP/IP packet that encapsulates a user IP packet, or a radio access bearer (RAB) identifier (ID) corresponding to the end-to-end tunnel.

10. The convergent transmission system according to claim 2, wherein:
    each packet data network (PDN) connection of the UE corresponds to a bearer channel, and the data offloading and converging node is further configured to:
    resolve user data transmitted through an air interface of the cellular system to obtain an IP address of a corresponding PDN connection of the UE; and
    create a fourth mapping relationship, wherein the fourth mapping relationship is a mapping relationship between the IP address of every PDN connection of the UE and the bearer channel of the UE.

11. The convergent transmission system according to claim 1, wherein the data offloading and converging node is configured to:
    in the uplink direction, receive an uplink data flow that needs to be transmitted over a WLAN radio bearer, wherein the uplink data flow that needs to be transmitted over the WLAN radio bearer is sent by the WLAN access point to the data offloading and converging node through a corresponding UDP port;
    obtain a MAC address corresponding to the UDP port according to the first mapping relationship;
    find all bearer channels corresponding to the UE having the MAC address according to the second mapping relationship;

according to the third mapping relationship, find a bearer channel of the UE corresponding to each end-to-end tunnel that transmits the part or all of the uplink data flows; and forward the part or all of the data flows to corresponding bearer channels of the UE respectively;

in the downlink direction, receive different downlink data flows transmitted over corresponding downlink bearer channels of the UE, wherein the different downlink data flows are obtained by a GGSN by separating downlink data of the UE through a DL-TFT function; and according to the data offloading policy negotiated with the UE, determine a part or all of the downlink data flows transmitted over the WLAN radio bearer; and map the part or all of the downlink data flows to an end-to-end tunnel respectively according to the third mapping relationship, wherein the end-to-end tunnel corresponds to each UE bearer channel that transmits the part or all of the downlink data flows; and send the part or all of the downlink data flows to the WLAN access point through the corresponding UDP port, whereupon, according to the first mapping relationship, the WLAN access point uses the UDP port number to send all the UE's downlink data packets from the UDP port through a WLAN air interface to the UE that has the MAC address corresponding to the UDP port number.

12. The convergent transmission system according to claim 1, wherein the data offloading and converging node is configured to:

in the uplink direction, receive all the UE's uplink data packets that are sent by the WLAN access point to the data offloading and converging node through the corresponding UDP port;

obtain the MAC address corresponding to the UDP port according to the first mapping relationship;

find all bearer channels corresponding to the UE having the MAC address according to the second mapping relationship;

separate, according to the UE's IP addresses in different PDN connections, all the UE's uplink data packets transmitted over the WLAN radio bearer into at least one data flow, and use the fourth mapping relationship to forward the at least one data flow to the corresponding bearer channel of the UE;

in the downlink direction, separate the downlink data packets of each PDN connection of the UE into different downlink data flows through a built-in packet filter; and send a part or all of the downlink data flows to the WLAN access point through the corresponding UDP port according to the data offloading policy negotiated with the UE, whereupon, according to the first mapping relationship, the WLAN access point uses the UDP port number to send all the UE's downlink data packets from the UDP port through a WLAN air interface to the UE that has the MAC address corresponding to the UDP port number.

13. A data offloading and converging node, comprising:

an offloading policy negotiating module, configured to negotiate with a user equipment (UE) to determine a data offloading policy; and an offload deciding module, configured to:
  according to the data offloading policy determined by negotiating with the UE, use a WLAN radio bearer to transmit a part of user data, wherein the WLAN radio bearer is a result of configuring a part of radio bearers of a cellular system as WLAN radio links, and use a remaining radio bearer of the cellular system to transmit a remaining part of the user data, wherein the radio bearers are a radio part of bearer channels of the cellular system, and the bearer channels of the cellular system are created through control plane signaling of the cellular system.

14. The data offloading and converging node according to claim 13, wherein the offloading policy negotiating module is configured to:

negotiate with the UE to determine a data offloading policy through offloading control signaling, wherein the offloading control signaling is carried in an application layer message transferred between the data offloading and converging node and the UE, or the offloading control signaling is carried in an RRC message transferred between the data offloading and converging node and the UE.

15. The data offloading and converging node according to claim 14, wherein the offload deciding module comprises:

a downlink data offloading unit, configured to offload downlink user data of the UE into a first part to be transmitted through a cellular access point and a second part to be transmitted through a WLAN access point; and a downlink transmitting unit, configured to transmit the first part of the data to the cellular access point and transmit the second part of the data to the WLAN access point respectively.

16. The data offloading and converging node according to claim 14, wherein the offload deciding module further comprises:

an uplink receiving unit, configured to receive a first part of uplink user data of the UE from the cellular access point and receive a second part of uplink user data from the WLAN access point;

an uplink converging unit, configured to converge the first part of uplink user data and the second part of uplink user data into uplink user data; and an uplink transmitting unit, configured to send the uplink user data to a cellular network.

17. The data offloading and converging node according to claim 13, further comprising:

a management and control module, configured to create a logical interface with a WLAN access point, and send management and control information through a control plane of the logical interface to manage and control the WLAN access point.

18. The data offloading and converging node according to claim 14, further comprising:

a first creating module, configured to create a first mapping relationship, wherein the first mapping relationship is a mapping relationship between a MAC address of the UE and a UDP port number of a user plane interface that is between the data offloading and converging node and a WLAN AP.

19. The data offloading and converging node according to claim 14, further comprising:

a second creating module, configured to create a second mapping relationship, wherein the second mapping relationship is a mapping relationship between a MAC address of the UE and every bearer channel of the UE.

20. The data offloading and converging node according to claim 19, wherein the second creating module comprises:

a receiving unit, configured to receive the UE's international mobile subscriber identity (IMSI) and MAC address that are sent by the UE through the offloading control signaling; and a mapping relationship creating unit, configured to create a mapping relationship between the MAC address of the UE and every bearer channel of the UE according to a stored mapping relationship between the IMSI of the UE and every bearer channel of the UE.

21. The data offloading and converging node according to claim 14, further comprising:
a tunnel creating module, configured to create at least one end-to-end tunnel between the data offloading and converging node and the UE if the user data is transmitted over a WLAN radio bearer, wherein each end-to-end tunnel transmits one of the UE's data flows transmitted over the WLAN radio bearer.

22. The data offloading and converging node according to claim 21, further comprising:
a third creating module, configured to create a third mapping relationship, wherein the third mapping relationship is a mapping relationship between the end-to-end tunnel and the bearer channel of the UE.

23. The data offloading and converging node according to claim 21, wherein:
a tunnel number of the end-to-end tunnel is a UDP port number in an outer UDP/IP packet that encapsulates a user IP packet, or a radio access bearer (RAB) identifier (ID) corresponding to the end-to-end tunnel.

24. The data offloading and converging node according to claim 14, further comprising:
a fourth creating module, configured to: resolve user data transmitted through an air interface of the cellular system to obtain an IP address of a corresponding PDN connection of the UE; and create a fourth mapping relationship, wherein the fourth mapping relationship is a mapping relationship between the IP address of every PDN connection of the UE and a bearer channel of the UE, and each PDN connection of the UE corresponds to a bearer channel.

25. A user equipment (UE), comprising:
an uplink user data obtaining module, configured to obtain uplink user data; and
an uplink data offloading module, configured to:
according to a data offloading policy determine by negotiating with a data offloading and converging node, use a WLAN radio bearer to transmit a part of the uplink user data to the data offloading and converging node, and
use channels of a cellular system to transmit a remaining part of the uplink user data to the data offloading and converging node, whereupon the data offloading and converging node converges the part of the uplink user data and the remaining part of the uplink user data into uplink user data.

26. The UE according to claim 25, further comprising:
an uplink offload negotiating module, configured to negotiate with the data offloading and converging node to determine a data offloading policy through offloading control signaling, wherein the offloading control signaling is carried in an application layer message transferred between the data offloading and converging node and the UE, or the offloading control signaling is carried in an RRC message transferred between the data offloading and converging node and the UE.

27. The UE according to claim 26, further comprising:
a tunnel creating module, configured to create at least one end-to-end tunnel at the data offloading and converging node if the user data is transmitted over a WLAN radio bearer, wherein each end-to-end tunnel transmits one of the UE's data flows transmitted over the WLAN radio bearer.

28. The UE according to claim 26, further comprising:
a PDN connection creating module, configured to create a PDN connection to one or more packet data networks (PDNs) through a control plane of an air interface of the cellular system, wherein each PDN connection corresponds to a bearer channel, and an IP address is allocated to each PDN connection.

29. The UE according to claim 26, further comprising:
a PDN mapping relationship creating module, configured to set up a mapping relationship between the IP address of every PDN connection of the UE and an application layer.

30. The UE according to claim 27, further comprising: a packet filter located outside a transceiving module of the cellular system and configured to separate the uplink user data of each PDN connection from the application layer into uplink data flows; and
a WLAN sending module, configured to send a part or all of user data flows through a WLAN air interface according to the data offloading policy, wherein the part or all of user data flows carry an IP address corresponding to the application layer.

* * * * *